United States Patent
Berzinis et al.

(10) Patent No.: US 10,207,230 B2
(45) Date of Patent: Feb. 19, 2019

(54) COMPOSITE MEMBRANE WITH SUPPORT COMPRISING POLY(PHENYLENE ETHER) AND AMPHILPHILIC POLYMER; METHOD OF MAKING; AND SEPARATION MODULE THEREOF

(71) Applicant: SABIC Global Technologies B.V., Bergen op Zoom (NL)

(72) Inventors: Albin Peter Berzinis, Delmar, NY (US); Pooja Bajaj, Schenectady, NY (US); Rachel Elizabeth Halbfinger, Glenville, NY (US); Matias Bikel, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 122 days.

(21) Appl. No.: 15/303,556

(22) PCT Filed: Apr. 30, 2015

(86) PCT No.: PCT/US2015/028532
§ 371 (c)(1),
(2) Date: Oct. 12, 2016

(87) PCT Pub. No.: WO2015/168414
PCT Pub. Date: Nov. 5, 2015

(65) Prior Publication Data
US 2017/0043301 A1 Feb. 16, 2017

Related U.S. Application Data

(60) Provisional application No. 61/987,171, filed on May 1, 2014.

(51) Int. Cl.
*B01D 67/00* (2006.01)
*B01D 69/02* (2006.01)
(Continued)

(52) U.S. Cl.
CPC ....... *B01D 69/125* (2013.01); *B01D 67/0006* (2013.01); *B01D 67/0016* (2013.01);
(Continued)

(58) Field of Classification Search
None
See application file for complete search history.

(56) References Cited

U.S. PATENT DOCUMENTS

| 3,446,856 A | 5/1969 | Hamilton |
| 3,522,326 A | 7/1970 | Bostick et al. |

(Continued)

FOREIGN PATENT DOCUMENTS

| CN | 103007787 A | 4/2013 |
| CN | 103170259 B | 12/2014 |

(Continued)

OTHER PUBLICATIONS

CN 103170259; Machine Translation; Date of Publication: Dec. 10, 2014; 10 pages.

(Continued)

Primary Examiner — Krishnan S Menon
(74) Attorney, Agent, or Firm — Cantor Colburn LLP

(57) ABSTRACT

A porous composite membrane includes a porous support layer of a poly(phenylene ether) or poly(phenylene ether) copolymer; and an amphiphilic copolymer having a hydrophobic block and a hydrophilic block or graft, wherein the hydrophobic block includes a polystyrene block, a poly(phenylene ether) block, or a poly(phenylene ether) copolymer block; and an ultrathin, cross-linked, water permeable layer, which is the reaction product of an electrophilic monomer and a nucleophilic monomer, in contact with a side of the porous support layer. The reaction product can be a polyamide that is the interfacial condensation product of: an aromatic, polyfunctional acyl halide comprising of 3 to 6

(Continued)

acyl halide groups per aromatic ring and an aromatic polyamine comprising at least two primary amine groups and a maximum number of primary amine groups that is less than or equal to the number of acyl halide groups on the polyfunctional acyl halide.

21 Claims, 5 Drawing Sheets

(51) Int. Cl.
| | |
|---|---|
| B01D 69/10 | (2006.01) |
| B01D 69/12 | (2006.01) |
| B01D 71/08 | (2006.01) |
| B01D 71/52 | (2006.01) |
| B01D 71/56 | (2006.01) |
| B01D 71/76 | (2006.01) |
| B01D 71/78 | (2006.01) |
| B01D 71/80 | (2006.01) |

(52) U.S. Cl.
CPC ............ *B01D 69/02* (2013.01); *B01D 69/10* (2013.01); *B01D 71/08* (2013.01); *B01D 71/52* (2013.01); *B01D 71/56* (2013.01); *B01D 71/76* (2013.01); *B01D 71/78* (2013.01); *B01D 71/80* (2013.01); *B01D 2323/02* (2013.01); *B01D 2323/40* (2013.01); *B01D 2325/36* (2013.01); *B01D 2325/38* (2013.01)

(56) References Cited

U.S. PATENT DOCUMENTS

| | | | |
|---|---|---|---|
| 3,703,564 | A | 11/1972 | White |
| 3,770,699 | A | 11/1973 | White |
| 3,970,640 | A | 7/1976 | Yonemitsu et al. |
| 4,201,880 | A | 5/1980 | Van Sorge |
| 4,277,344 | A | 7/1981 | Cadotte |
| 4,278,777 | A | 7/1981 | Jakabhazy et al. |
| 4,338,421 | A | 7/1982 | Maruyama et al. |
| 4,454,284 | A | 6/1984 | Ueno et al. |
| 4,528,327 | A * | 7/1985 | Cooper ............... C08L 51/04 523/201 |
| 4,622,206 | A | 11/1986 | Torgeson |
| 4,882,168 | A | 11/1989 | Casey et al. |
| 4,933,081 | A | 6/1990 | Sasaki et al. |
| 4,944,775 | A | 7/1990 | Hayes |
| 5,069,793 | A | 12/1991 | Kaschemekat et al. |
| 5,118,327 | A | 6/1992 | Nelson et al. |
| 5,128,421 | A | 7/1992 | Ohmura et al. |
| 5,132,363 | A | 7/1992 | Furuta et al. |
| 5,159,027 | A | 10/1992 | Kanayama et al. |
| 5,209,849 | A | 5/1993 | Hu et al. |
| 5,282,964 | A | 2/1994 | Young et al. |
| 5,385,976 | A | 1/1995 | Furuta et al. |
| 5,480,552 | A | 1/1996 | Soltys et al. |
| 5,527,467 | A | 6/1996 | Oftshun et al. |
| 5,643,968 | A | 7/1997 | Andreola et al. |
| 5,795,920 | A | 8/1998 | Kang et al. |
| 5,834,583 | A | 11/1998 | Hancock et al. |
| 6,294,499 | B1 | 9/2001 | Watson et al. |
| 6,437,084 | B1 | 8/2002 | Birsak et al. |
| 6,472,499 | B1 | 10/2002 | Braat et al. |
| 7,166,148 | B2 | 1/2007 | Lyons et al. |
| 7,208,438 | B2 | 4/2007 | Ingelbrecht et al. |
| 8,222,342 | B2 | 7/2012 | Weber et al. |
| 8,287,735 | B2 | 10/2012 | Hanemaaijer et al. |
| 8,302,781 | B2 | 11/2012 | Wechs et al. |
| 8,505,745 | B2 | 8/2013 | Mayes et al. |
| 8,602,221 | B2 | 12/2013 | Mizomoto et al. |
| 8,727,136 | B2 | 5/2014 | Ansorge et al. |
| 8,741,600 | B2 | 6/2014 | Yamaguchi et al. |
| 9,133,338 | B2 | 9/2015 | Yang et al. |
| 2004/0145127 | A1 | 7/2004 | Pinto |
| 2004/0149127 | A1 | 8/2004 | Lyons et al. |
| 2004/0231663 | A1 | 11/2004 | Carter et al. |
| 2005/0218057 | A1 | 10/2005 | Ngee |
| 2006/0076884 | A1 | 4/2006 | Ahn |
| 2006/0076885 | A1 | 4/2006 | Kim et al. |
| 2006/0137522 | A1 | 6/2006 | Nishimura et al. |
| 2007/0068871 | A1 | 3/2007 | Flynn |
| 2007/0202374 | A1 | 8/2007 | Bridges et al. |
| 2007/0238832 | A1 | 10/2007 | Borade et al. |
| 2008/0036454 | A1 | 2/2008 | Landrieve |
| 2008/0076884 | A1 | 3/2008 | Yeager et al. |
| 2008/0076885 | A1 | 3/2008 | Yeager et al. |
| 2008/0085989 | A1 | 4/2008 | Yeager et al. |
| 2008/0142429 | A1 | 6/2008 | Zhang et al. |
| 2008/0203012 | A1 | 8/2008 | Yeager et al. |
| 2008/0207822 | A1 | 8/2008 | Yeager et al. |
| 2008/0312349 | A1 | 12/2008 | Yeager et al. |
| 2009/0018303 | A1 | 1/2009 | Onizuka et al. |
| 2010/0244306 | A1 | 9/2010 | Tang |
| 2012/0100904 | A1 | 5/2012 | Morita et al. |
| 2012/0103904 | A1 | 5/2012 | Morita et al. |
| 2012/0277347 | A1 | 11/2012 | Bedner et al. |
| 2012/0305486 | A1 | 12/2012 | Storr et al. |
| 2013/0220924 | A1 | 8/2013 | Maeda |
| 2016/0008528 | A1 | 1/2016 | Roy et al. |
| 2016/0021191 | A1 | 1/2016 | Wang et al. |
| 2016/0022892 | A1 | 1/2016 | Eifler et al. |
| 2016/0079616 | A1 | 3/2016 | Lee et al. |
| 2017/0282131 | A1 | 10/2017 | Berzinis et al. |
| 2018/0079863 | A1 | 3/2018 | Ghanta |

FOREIGN PATENT DOCUMENTS

| | | |
|---|---|---|
| EP | 0216633 | 4/1987 |
| EP | 0568045 A1 | 11/1993 |
| EP | 0083489 B1 | 4/1999 |
| EP | 1918019 A1 | 5/2008 |
| EP | 2535101 A1 | 12/2012 |
| JP | S42004276 B | 2/1964 |
| JP | S46002837 B | 10/1967 |
| JP | S46006542 | 12/1971 |
| JP | S60114323 A | 6/1985 |
| JP | S62057915 | 3/1987 |
| JP | S62071503 A | 4/1987 |
| JP | S62152507 A | 7/1987 |
| JP | S63100916 A | 5/1988 |
| JP | S63128021 A | 5/1988 |
| JP | S63197502 | 8/1988 |
| JP | S63218231 A | 9/1988 |
| JP | S63230173 A | 9/1988 |
| JP | H03065227 A | 3/1991 |
| JP | H04011927 | 1/1992 |
| JP | H08143699 A | 6/1996 |
| JP | S64030621 | 2/1999 |
| JP | H11156165 A | 6/1999 |
| JP | H11322921 A | 11/1999 |
| JP | 2000246064 A | 9/2000 |
| JP | 2004231743 A | 8/2004 |
| JP | 2005262211 A | 9/2005 |
| JP | 2013013838 A | 1/2013 |
| JP | 2014205761 A | 10/2014 |
| WO | 0240140 A1 | 5/2002 |
| WO | 03000389 A2 | 1/2003 |
| WO | 2004056459 A1 | 7/2004 |
| WO | 2005107929 A2 | 11/2005 |
| WO | 2008103599 A2 | 8/2008 |
| WO | 2012008837 A2 | 1/2012 |
| WO | 2013131848 A1 | 9/2013 |
| WO | 2014195234 A1 | 12/2014 |
| WO | 2015168392 A1 | 11/2015 |
| WO | 2015168409 A1 | 11/2015 |
| WO | 2015168423 A1 | 11/2015 |
| WO | 2015168584 A1 | 11/2015 |
| WO | 2015168592 A1 | 11/2015 |

(56) References Cited

FOREIGN PATENT DOCUMENTS

| WO | 2015168418 A1 | 11/2016 |
|---|---|---|
| WO | 2016178835 A1 | 11/2016 |

OTHER PUBLICATIONS

Final Office Action dated Jun. 7, 2017; U.S. Appl. No. 15/356,836; filed Nov. 21, 2016; 16 pages.
International Search Report for International Application No. PCT/US2016/028951; International Filing Date Apr. 22, 2016; dated Jul. 29, 2016; 7 pages.
International Search Report for International Application No. PCT/US2017/022061; Date of Filing: Mar. 13, 2017; dated Jul. 4, 2017; 6 pages.
International Search Report for International Application No. PCT/US2017/022088; Date of Filing: Mar. 13, 2017; dated Jun. 28, 2017; 6 pages.
JP S60114323; Machine Translation; Date of Publication: Jun. 20, 1985; 8 pages.
Loh et al.; "Fabrication of high performance polyethersulfone UF hollow fiber membranes using amphiphilic Pluronic block copolymers as pore-forming additives"; J. Membr. Sci., vol. 380; 2011; 114-123.
Non-Final Office Action dated Feb. 16, 2017; U.S. Appl. No. 15/356,836, filed Nov. 21, 2016; 24 pages.
Non-Final Office Action dated Mar. 6, 2017; U.S. Appl. No. 15/356,854, filed Nov. 21, 2016; 28 pages.
Susanto et al.; "Characteristics, performance and stability of polyethersulfone ultrafiltration membranes prepared by phase separation method using different macromolecular additives"; J. Membr. Sci., vol. 327; 2009; p. 125-35.
U.S. Appl. No. 15/356,836 to Berzinis; filed Nov. 21, 2016; 29 pages.
U.S. Appl. No. 15/356,854 to Berzinis; filed Nov. 21, 2016; 38 pages.
U.S. Appl. No. 62/155,593 to Berzinis; filed May 1, 2015; 36 pages.
Written Opinion of the International Search Report for International Application No. PCT/US2016/028951; International Filing Date Apr. 22, 2016; dated Jul. 29, 2016; 9 pages.
Written Opinion of the International Searching Authority for International Application No. PCT/US2017/022061; Date of Filing: Mar. 13, 2017; dated Jul. 4, 2017; 9 pages.
Written Opinion of the International Searching Authority for International Application No. PCT/US2017/022088; Date of Filing: Mar. 13, 2017; dated Jun. 28, 2017; 8 pages.
Asatekin et al.; "Anti-fouling ultrafiltration membranes containing polyacrylonitrile-graft-poly(ethylene oxide) comb copolymer additives"; Journal of Membrane Science 298 (2007) pp. 136-146.
ATRP Solutions; 2011 Catalog; 9 pages.
Baker; "Membranes and Modules"; Membrane Technology & Applications, Third Edition; 2012 John Wiley & Sons; pp. 97-178.
Bernardo et al.; "Membrane Gas Separation: A Review/State of the Art"; Ind. Eng. Chem. Res. 2009, 48, pp. 4638-4663.
Chung et al.; "Formation of ultrathin high-performance polyethersulfone hollow-fiber membranes"; Journal of Membrane Science 133 (1997) pp. 161-175.
Cooper et al.; "Preparation and Properties of Poly(arylene oxide) Copolymers"; Advances in Chemistry; American Chemical Society; 1973; pp. 230-257.
Cooper et al.; "Preparation and Properties of Polyarylene Oxide Copolymers "; 1973; pp. 551-556.
Dongliang et al.; "Polyethersulfone hollow fiber gas separation membranes prepared from NMP/alcohol solvent systems"; Journal of Membrane Science; 115; 1996, pp. 85-108.
International Search Report for International Application No. PCT/US2015/028532, International Filing Date Apr. 30, 2015, dated Jul. 28, 2015, 5 pages.
Kang et al.; "Protein antifouling mechanisms of PAN UF membranes incorporating PAM-g-PEO additive"; Journal of Membrane Science 296 (2007) pp. 42-50.
Kim et al.; "Ultrafiltration membranes prepared from blends of polyethersulfone and poly(1-vinylpyrrolidone-co-styrene) copolymers"; Journal of Membrane Science 262 (2005) pp. 60-68.
Liang et al.; "Synthesis and characterization of poly(phenylene oxide) graft copolymers by atom transfer radical polymerizations"; European Polymer Journal 45 (2009) pp. 2348-2357.
Petersen; "Composite reverse osmosis and nanofiltration membranes"; Journal of Membrane Science, 83 (1993) pp. 81-150.
Semsarzadeh et al.; "Synthesis and Characterization of Poly(phenylene oxide)-Based Block Copolymers via Cobalt Mediated Radical Polymerization (CMRP)"; Silicon; 6, 2014, pp. 27-34.
Smid et al.; "The formation of asymmetric hollow fibre membranes for gas separation, using PPE of different intrinsic viscosities"; Journal of Membrane Science, 64, 1991, pp. 121-128.
Ulbricht, "Advanced functional polymer membranes", Polymer; 47; Jan. 2006; pp. 2217-2262.
Vandezande et al.; "High throughput study of phase inversion parameters for polyimide-based SRNF membranes"; Journal of Membrane Science, 330, 2009, pp. 307-318.
Wang et al.; "Highly permeable polyethersulfone hollow fiber gas separation membranes prepared using water as non-solvent additive"; Journal of Membrane Science 176 (2000) pp. 147-158.
Wang et al.; "Polyethersulfone hollow fiber gas separation membranes prepared from NMP/alcohol solvent systems"; Journal of Membrane Science 115 (1996) pp. 85-108.
Written Opinion for International Application No. PCT/US2015/028532, International Filing Date Apr. 30, 2015, dated Jul. 28, 2015, 9 pages.
Yang et al.; "Tailoring pore size and pore size distribution of kidney dialysis hollow fiber membranes via dual-bath coagulation approach"; Journal of Membrane Science 290 (2007) pp. 153-163.
Yeager et al.; "Polyethers, Aromatic"; Encyclopedia of Polymer Science and Technology; vol. 11; John Wiley & Sons; 2003; pp. 64-87.
U.S. Appl. No. 15/303,562, filed Oct. 12, 2016, US2017/0021311, WO2015/168392.
U.S. Appl. No. 15/303,561, filed Oct. 12, 2016, US2017/0037177, WO2015/168409.
U.S. Appl. No. 15/303,556, filed Oct. 12, 2016, US2017/0043301, WO2015/168414.
U.S. Appl. No. 15/303,058, filed Oct. 10, 2016, US2017/0036169, WO2015/168418.
U.S. Appl. No. 15/303,061, filed Oct. 10, 2016, US2017/0043297, WO2015/168592.
U.S. Appl. No. 15/302,275, filed Oct. 6, 2016, US2017/0056835, WO2015/168423.
U.S. Appl. No. 15/302,323, filed Oct. 6, 2016, US2017/0021310, WO2015/168584.
U.S. Appl. No. 15/356,836, filed Nov. 21, 2016.
U.S. Appl. No. 15/356,854, filed Nov. 21, 2016.
U.S. Appl. No. 62/155,593, filed May 1, 2015, WO2016/178835.
Non-Final Office Action for U.S. Appl. No. 15/303,562; dated Feb. 6, 2018.
Restriction Requirement for U.S. Appl. No. 15/302,323 dated Apr. 30, 2018; 8 pages.
Restriction Requirement for U.S. Appl. No. 15/303,058; dated May 1, 2018; 8 pages.
Restriction Requirement for U.S. Appl. No. 15/303,061; dated May 4, 2018; 8 pages.
Restriction Requirement for U.S. Appl. No. 15/303,561; dated Apr. 27, 2018; 10 pages.
Restriction Response for U.S. Appl. No. 15/302,276; dated Apr. 23, 2018; 8 pages.
Machine Translation for JPH011322921A.
Advisory Action Dated Aug. 8, 2017 for U.S. Appl. No. 15/356,836; 4 pages.
International Preliminary Report on Patentability for International Application No. PCT/US2016/028951; Date of Filing: Apr. 22, 2016; dated Aug. 7, 2017; 57 pages.
Machine Translation for JPH08143699.

(56) References Cited

OTHER PUBLICATIONS

Machine Translation for JPS46006542.
Machine Translation for JPS62152507A.
Non-Final Office Action dated Jan. 4, 2018 for U.S. Appl. No. 15/536,836; 11 pages.
U.S. Notice of Allowance, U.S. Appl. No. 15/356,854, dated Aug. 16, 2017, 16 pages.
Written Opnion of the International Searching Authority for International Application No. PCT/US2016/028951; Date of Filing: Apr. 22, 2016; dated Apr. 11, 2017; 10 pages.
Final Office Action for U.S. Appl. No. 15/356,836 dated Apr. 20, 2018, 22 pages.
Machine Translation for JPH08143699 obtained from Espacenet on Jan. 12, 2018, 10 pages; (https://worldwide.espacenet.com/publicationDetails/biblio?II=0&ND=3&adjacent=true&locale=en_EP&FT=D&date=19960604&CC=JP&NR=H08143699A&KC=A#).
Machine Translation for JPS4665420A obtained from J-Plat Pat on Jan. 8, 2018, 14 pages; (https://www4.j-platpat.inpit.go.jp/cgi-bin/tran_web_cgi_ejje?u=http://www4.j-platpat.inpit.go.jp/eng/translation/20180424050647402376855621217 41056C2CF07F06D8BF80DAC7BA11D51D95A0).
Machine Translation for JPS62152507A obtained from Espacenet on Jan. 12, 2018 , 11 pages; https://worldwide.espacenet.com/publicationDetails/biblio?II=0&ND=3&adjacent=true&locale=en_EP&FT=D&date=19870707&CC=JP&NR=S62152507A&KC=A#).
Non Final Office Action for U.S. Appl. No. 15/303,561; dated Jul. 26, 2018; 16 pages.
Advisory Action for U.S. Appl. No. 15/356,836; dated Jul. 3, 2018; 9 Pages.
Li et al., Ed., "Water Treatment and Water Quality Control of Power Station"; China Electric Power Press; 2012; pp. 203-204.
Li et al,, Ed., "Water Treatment and Water Quality Control of Power Station"; China Electric Power Press; 2012; pp. 203-204 (Original in Chinese).
Non Final Office Action for U.S. Appl. No. 15/303,061; dated Jul. 19, 2018; 53 pages.
Non-Final Office Action for U.S. Appl. No. 15/302,276; dated Jul. 19, 2018; 45 pages.
Non-Final Office Action for U.S. Appl. No. 15/302,323; dated Jul. 19, 2018; 51 pages.
Non-Final Office Action for U.S. Appl. No. 15/303,058; dated Jul. 19, 2018; 56 pages.
Notice of Allowance for U.S. Appl. No. 15/303,562; dated Jun. 1, 2018; 25 pages.
Shi et al., Ed., "Membrane Technology Manual"; Chemical Industry Press; 2001; p. 199 (Original in Chinese).
Shi et al., Ed., "Membrane Technology Manual"; Chemical Industry Press; p. 199.
Wang, Ed. "Biomedical Engineering Principles"; Science Press; 1982; p. 326 (Original in Chinese).
Wang, Ed. "Biomedical Engineering Principles"; Science Press; 1982; p. 326.
Wang, Ed., "Membrane Separation Technology and Use Thereof"; Science Press; 1994; p. 181 (Original in Chinese).
Wang, Ed., "Membrane Separation Technology and Use Thereof"; Science Press; 1994; p. 181.
Zhong et al., Ed., "Principle of Chemical Industry", National Defense Industry Press; 2013; p. 399 (Original in Chinese).
Zhong et al., Ed., "Principle of Chemical Industry", National Defense Industry Press; 2013; p. 399.

\* cited by examiner

COMPOSITE MEMBRANE WITH SUPPORT COMPRISING POLY(PHENYLENE ETHER) AND AMPHILPHILIC POLYMER; METHOD OF MAKING; AND SEPARATION MODULE THEREOF

CROSS REFERENCE TO RELATED APPLICATIONS

This application is a National Stage application of PCT/US2015/028532, filed Apr. 30, 2015, which claims the benefit of U.S. Provisional Application No. 61/987,171, filed May 1, 2014, both of which are incorporated by reference in their entirety herein.

BACKGROUND OF THE INVENTION

Poly(phenylene ether)s are a class of plastics having excellent water resistance, thermal resistance, and dimensional stability. They retain their mechanical strength in hot and/or wet environments. Therefore they can be used for the fabrication of porous asymmetric membranes useful in various separation processes. For example, poly(phenylene ether)s can be used in processes that require repeated cleaning with hot water or steam sterilization. However the use of poly(phenylene ether)s in various water treatment processes can be limited because of their hydrophobicity. The membranes are not wettable by water, and a high pressure gradient is required to pass water through the membrane pores. Moreover, hydrophobic interactions between the membrane and solutes in feed streams can cause membrane fouling, which adversely affects membrane performance, and requires cleaning or membrane replacement.

The surface of membranes fabricated from hydrophobic polymers can be made hydrophilic by blending with a hydrophilic polymer. For example, polyethersulfone can be blended with poly(N-vinylpyrrolidone), and the two polymers can be co-precipitated from solution to form a membrane. However, excess poly(N-vinylpyrrolidone) must be washed off of the membrane with water, which results in a waste of valuable material, and which produces an aqueous waste comprising the excess poly(N-vinylpyrrolidone). Moreover the hydrophilic polymer can be leached out of the membrane in membrane treatment of aqueous streams. There remains a need for a polymer that provides a hydrophilic surface to porous asymmetric membranes fabricated from hydrophobic polymers. The polymer should be hydrophilic and still have an affinity for the hydrophobic polymer, so that it is not extracted by washing during fabrication or in end-use operation of the membrane.

BRIEF DESCRIPTION OF THE INVENTION

A porous composite membrane comprises a porous support layer comprising, consisting essentially of, or consisting of a hydrophobic polymer comprising, consisting essentially of, or consisting of a poly(phenylene ether) or poly(phenylene ether) copolymer; and an amphiphilic copolymer comprising a hydrophobic block and a hydrophilic block or graft wherein the hydrophobic block comprises a polystyrene block, a poly(phenylene ether) block or a poly(phenylene ether) copolymer block; and an ultrathin, cross-linked, water permeable layer in contact with a side of the porous support layer, and comprising the reaction product of an electrophilic monomer and a nucleophilic monomer.

BRIEF DESCRIPTION OF THE DRAWINGS

Referring now to the drawings.

DETAILED DESCRIPTION OF THE INVENTION

Figure 1:
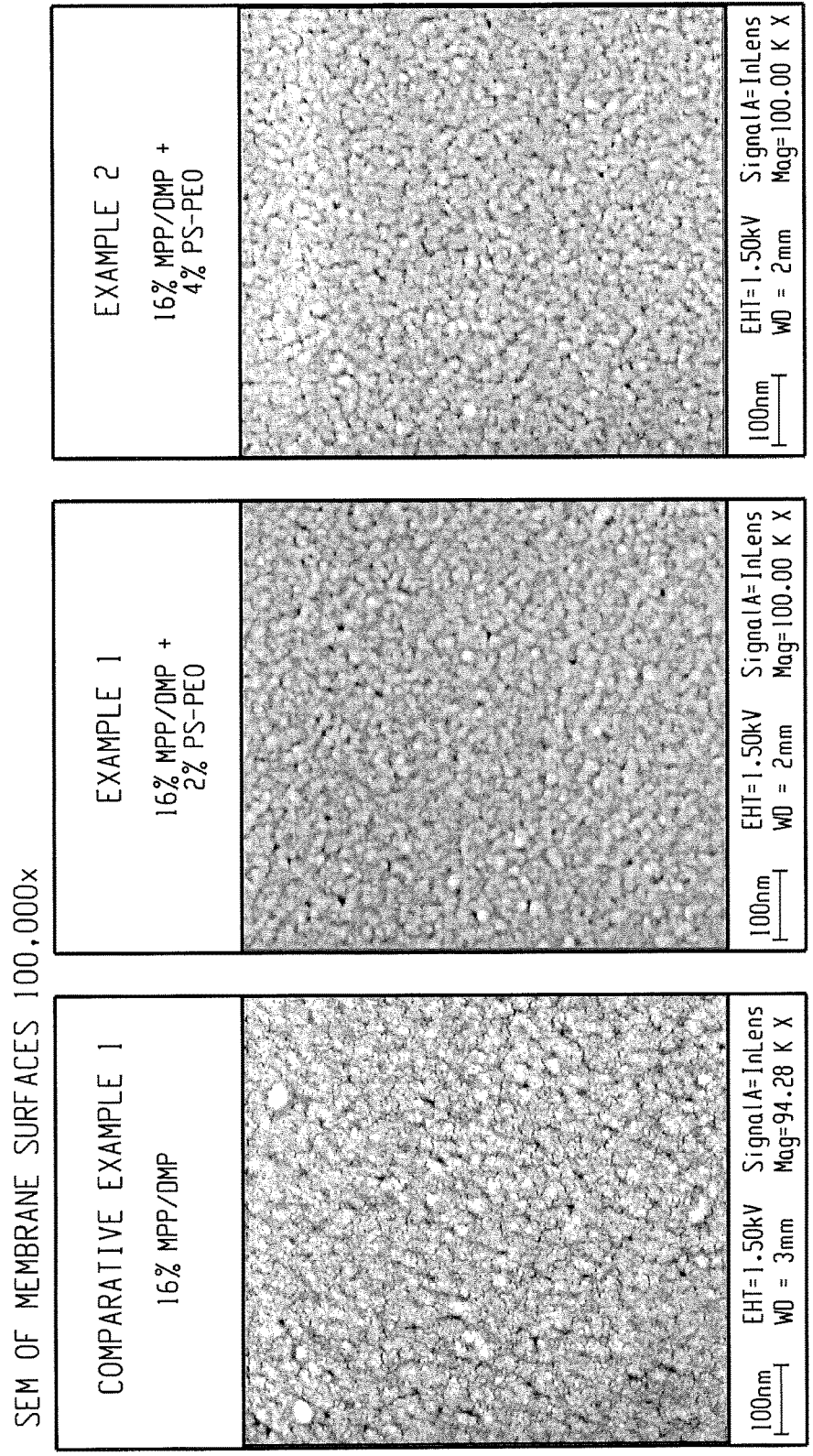
FIG. 1 depicts scanning electron microscopy (SEM) images of the porous composite membrane surfaces of Comparative Example 1 and Examples 1 and 2.

The inventors hereof have discovered porous composite membranes that include a porous support layer and an ultrathin water permeable layer. The porous support layer includes a combination of two polymers: a hydrophobic polymer that is a poly(phenylene ether) or poly(phenylene ether) copolymer; and an amphiphilic copolymer. The amphiphilic copolymer includes a hydrophobic block and a hydrophilic block or graft. The hydrophobic block comprises a polystyrene block, a poly(phenylene ether) block or a poly(phenylene ether) copolymer block. The membranes provide a combination of improved membrane selectivity, permeation flux, and lifetime.

As stated above, the porous support layer comprises two polymers, the first being a hydrophobic polymer comprising a poly(phenylene ether) or poly(phenylene ether) copolymer. The hydrophobic polymer can comprise a poly(phenylene ether) comprising having repeat units (I):

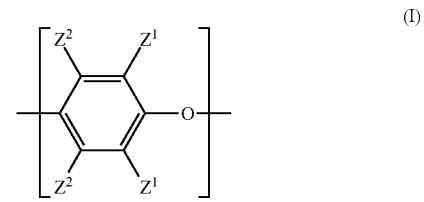

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. In some embodiments, the poly(phenylene ether) comprises poly(2,6-dimethyl-1,4-phenylene ether).

The hydrophobic polymer can comprise a poly(phenylene ether) copolymer, for example a copolymer of 2,6-dimethylphenol and 2,3,6-trimethylphenol. In some embodiments, the hydrophobic copolymer comprises: 100 to 20 mole percent repeat units derived from 2,6-dimethylphenol; and more than 0 to 80 mole percent repeat units derived from a second monohydric phenol (II) wherein Z is $C_{1-12}$ alkyl, $C_{3-12}$ cycloalkyl, or monovalent group (III)

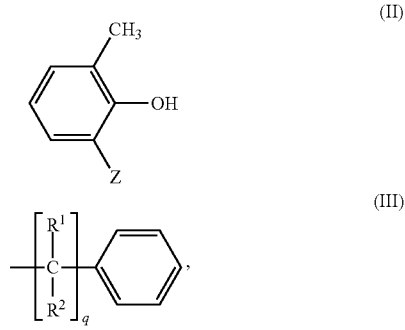

wherein q is 0 or 1, and $R^1$ and $R^2$ are independently hydrogen or $C_1$-$C_6$ alkyl; wherein the mole percents are based on the total moles of all repeat units; and wherein the poly(phenylene ether) copolymer has an intrinsic viscosity of 0.7 to 1.5 deciliters per gram, measured in chloroform at 25° C. In some embodiments, the hydrophobic polymer comprises a poly(phenylene ether) copolymer comprising: 80 to 20 mole percent repeat units derived from 2,6-dimethylphenol; and 20 to 80 mole percent repeat units derived from the second monohydric phenol. Preferably, the second monohydric phenol comprises 2-methyl-6-phenylphenol.

The hydrophobic polymer can be a poly(phenylene ether) copolymer having an intrinsic viscosity greater than or equal to 0.7, 0.8, 0.9, 1.0, or 1.1 deciliters per gram, and less than or equal to 1.5, 1.4, or 1.3 deciliters per gram, when measured in chloroform at 25° C. In some embodiments, the intrinsic viscosity is 1.1 to 1.3 deciliters per gram. In some embodiments, the poly(phenylene ether) copolymer has a weight average molecular weight of 100,000 to 500,000 daltons (Da), as measured by gel permeation chromatography against polystyrene standards. Within this range, the weight average molecular weight can be greater than or equal to 150,000 or 200,000 Da and less than or equal to 400,000, 350,000, or 300,000 Da. In some embodiments, the weight average molecular weight is 100,000 to 400,000 Da, specifically 200,000 to 300,000 Da. The poly(phenylene ether) copolymer can have a polydispersity (ratio of weight average molecular weight to number average molecular weight of 3 to 12. Within this range, the polydispersity can be greater than or equal to 4 or 5 and less than or equal to 10, 9, or 8.

The solubility of the hydrophobic polymer in water-miscible polar aprotic solvents can be 50 to 400 grams per kilogram at 25° C., based on the combined weight of the hydrophobic polymer and the solvent. Within this range, the solubility can be greater than or equal to 100, 120, 140, or 160 grams per kilogram, and less than or equal to 300, 250, 200, or 180 grams per kilogram at 25° C. Advantageously, the use hydrophobic polymers having an intrinsic viscosity of 0.7 to 1.5 deciliters per gram and a solubility of 50 to 400 grams per kilogram at 25° C. results in membrane-forming compositions with solution concentrations and viscosities that provide good control over the phase inversion step of membrane formation. Advantageously, a hydrophobic polymer intrinsic viscosity of 0.7 to 1.5 deciliters per gram and a solubility of 50 to 400 grams per kilogram provide membrane-forming compositions conducive to the formation of porous composite membranes in the absence of hydrophilic polymers, for example, poly(N-vinylpyrrolidone), which can serve as viscosity modifiers.

The second polymer in the porous composite membrane is an amphiphilic block copolymer. The amphiphilic block copolymer comprises a hydrophobic block and a hydrophilic block or graft, wherein the hydrophobic block comprises a polystyrene block, a poly(phenylene ether) block, or a poly(phenylene ether) copolymer block. These amphiphilic block copolymers are differentiated from random copolymers of hydrophobic ethylenically unsaturated monomers and hydrophilic ethylenically unsaturated copolymers, for example a random copolymer of styrene and N-vinylpyrrolidone, in that the hydrophobic monomer repeat units and hydrophilic monomer repeat units are localized in homopolymer blocks comprising either comonomer. In some embodiments, the amphiphilic block copolymer comprises 20 to 50 weight percent of the hydrophobic block and 50 to 80 weight percent of the hydrophilic block or graft.

The amphiphilic block copolymer comprises a hydrophobic block. The hydrophobic block can comprise polystyrene. The hydrophobic block of the amphiphilic block copolymer can comprise a poly(phenylene ether). In some embodiments, the hydrophobic block of the amphiphilic block copolymer comprises a poly(phenylene ether) comprising repeat units (I), wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. In some embodiments, the hydrophobic block comprises poly(2,6-dimethyl-1,4-phenylene ether).

The hydrophobic block of the amphiphilic block copolymer can comprise a poly(phenylene ether) copolymer, for example a copolymer of 2,6-dimethylphenol and 2,3,6-trimethylphenol. In some embodiments, the hydrophobic block of the amphiphilic block copolymer comprises a poly(phenylene ether) copolymer comprising: 100 to 20 mole percent repeat units derived from 2,6-dimethylphenol; and 0 to 80 mole percent repeat units derived from the second monohydric phenol (II) wherein Z is $C_{1-12}$ alkyl, $C_{3-12}$cycloalkyl, or monovalent group (III), wherein q is 0 or 1, and $R^1$ and $R^2$ are independently hydrogen or $C_1$-$C_6$ alkyl; wherein all mole percents are based on the total moles of all repeat units; and wherein the poly(phenylene ether) copolymer block has an intrinsic viscosity of 0.1 to 0.5 deciliters per gram, measured in chloroform at 25° C.

Preferably, the hydrophobic block of the amphiphilic block copolymer comprises repeat units derived from 2,6-dimethylphenol. In some embodiments, the hydrophobic block of the amphiphilic copolymer comprises a poly(phenylene ether) copolymer comprising: 80 to 20 mole percent repeat units derived from 2,6-dimethylphenol; and 20 to 80 mole percent repeat units derived from the second monohydric phenol, and preferably the second monohydric phenol comprises 2-methyl-6-phenylphenol.

The amphiphilic block copolymer further comprises a hydrophilic block or graft. In some embodiments, the hydrophilic block or graft of the amphiphilic block copolymer comprises polymerized hydrophilic ethylenically unsaturated monomers. The hydrophilic ethylenically unsaturated monomer can be one or more of acrylic acid esters, methacrylic acid esters, hydroxyalkyl acrylates, hydroxyalkyl methacrylates, acrylamide derivatives, vinyl pyridines and alkyl-substituted derivatives thereof, vinyl carbazoles, vinyl acetate, vinyl sulfonic acid, vinyl phosphoric acid, 4-styrenesulfonic acid, N-vinylpyrrolidone, and combinations comprising at least one of the foregoing. Specific hydrophilic ethylenically unsaturated monomers comprise acrylic acid, methacrylic acid, ethyl methacrylate, ethyl acrylate, 2-hydroxyethyl acrylate, 2-hydroxypropyl acrylate, 3-hydroxypropyl acrylate, 1-hydroxy-prop-2-yl acrylate, 2-hydroxyprop-1-yl acrylate, 2,3-dihydroxypropyl acrylate, 2-hydroxyethyl methacrylate, maleic anhydride, acrylamide, N-methylacrylamide, N,N-dimethylacrylamide, vinyl acetate, 2-vinyl pyridine, 4-vinylpyridine, 2-methyl-5-vinyl pyridine, 2-ethyl-5-vinyl pyridine, N-vinylpyrrolidone, N-vinylcarbazole, oxazoline, vinyl sulfonic acid, vinyl phosphoric acid, phosphoethyl methacrylate, and combinations comprising at least one of the foregoing. The hydrophilic ethylenically unsaturated monomer preferably comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing. In some embodiments, the hydrophobic block of the amphiphilic block copolymer comprises polystyrene, and the hydrophilic block of the amphiphilic block copolymer comprises poly(acrylic acid). The amphiphilic block copolymer can be, for example polystyrene-block-poly(acrylic acid).

The hydrophilic block of the amphiphilic block copolymer used in the porous composite membrane can comprise a poly(alkylene oxide) block. The poly(alkylene oxide) block can comprise poly(alkylene oxide) or a poly(alkylene oxide) copolymer wherein the alkylene oxide monomers are ethylene oxide, 1,2-propylene oxide, 1,2-butylene oxide, styrene oxide, or a combination comprising at least one of the foregoing. The poly(alkylene oxide) and comprise poly(ethylene oxide) or a copolymer of ethylene oxide and 1,2-propylene oxide, 1,2-butylene oxide, styrene oxide, or a combination thereof, wherein the poly(alkylene oxide) copolymer contains sufficient ethylene oxide repeat units for the hydrophilic block or graft to be hydrophilic. In some embodiments, the poly(alkylene oxide) block comprises poly(ethylene oxide) repeat units of the formula

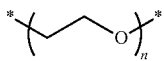

wherein n is 1 to 100. Poly(alkylene oxide) copolymers can be block copolymers or random copolymers, and can be prepared by the polyaddition of ethylene oxide, 1,2-propylene oxide, 1,2-butylene oxide, styrene oxide, or a combination comprising at least one of the foregoing, onto a monohydroxyl or di-hydroxyl initiator compound. The poly(alkylene oxide) can have a number average molecular weight of 200 to 5,000 grams per mole, specifically 500 to 2,500 grams per mole. In some embodiments, the hydrophobic block of the amphiphilic block copolymer used in the porous composite membrane comprises polystyrene, and the hydrophilic block of the amphiphilic block copolymer used in the porous composite membrane comprises poly(ethylene oxide). The amphiphilic copolymer can be, for example polystyrene-block-poly(ethylene oxide). The polystyrene block can have a number average molecular weight of about 30,000 grams per mole, and the poly(ethylene oxide) block can have a number average molecular weight of about 1,000 grams per mole.

The relative amount of each of the hydrophobic polymer and the amphiphilic polymer in the membrane can vary, depending on the desired membrane characteristics. For example the weight ratio of the hydrophobic polymer to the amphiphilic polymer can be 10:90 to 90:10, specifically 20:80 to 80:20, more specifically 30:70 to 70:30, or 40:60 to 60:40.

In some embodiments, a hydrophilic polymer is excluded from the porous composite membrane. The excluded hydrophilic polymer can comprise, for example, polyacrylamide, poly(N,N-dimethylacrylamide), poly(vinyl alcohol), a poly(vinyl ether), a poly(vinyl ester), such as poly(vinyl acetate) or poly(vinyl propionate), a poly(vinyl aldehyde), such as poly(vinyl formal) or poly(vinyl butryal), a poly(vinyl amine), such as poly(4-vinylpyridine), poly(N-vinylpyrrolidone), poly(N-vinylimidazole), poly(4-acryloylmorpholine), a poly(oxazoline), poly(ethyleneamine), poly(ethylene oxide), poly(propylene oxide), a poly(ethylene oxide) monoether, a block copolymer of poly(ethylene oxide) and poly(propylene oxide), poly(alkoxy-capped poly(ethylene oxide) methacrylate), or a combination comprising at least one of the foregoing. Preferably, the excluded hydrophilic polymer comprises poly(N-vinylpyrrolidone), a poly(oxazoline), poly(ethylene oxide), poly(propylene oxide), a poly(ethylene oxide) monoether or monoester, a poly(propylene oxide) monoether or monoester, a block copolymer of poly(ethylene oxide) and poly(propylene oxide), polysorbate, cellulose acetate, or a combination comprising at least one of the foregoing. In some embodiments, the excluded hydrophilic copolymer comprises poly(N-vinylpyrrolidone). Hydrophilic polymers have been used in membrane-forming compositions to impart a viscosity to the membrane-forming composition that is conducive to the formation of a porous composite membrane useful for purification of aqueous streams. However, hydrophilic polymers, when present in the porous composite membrane, are prone to extraction in the phase inversion and washing steps of membrane fabrication. Moreover the hydrophilic polymer can be leached out of the membrane in the end-use application—membrane treatment of aqueous streams. For example, polyethersulfone can be blended with poly(N-vinylpyrrolidone), and the two polymers can be co-precipitated from solution to form a membrane. Excess poly(N-vinylpyrrolidone) must be washed off of the membrane with water, which results in a waste of valuable material, and which produces an aqueous waste comprising the excess poly(N-vinylpyrrolidone). Advantageously, the porous composite membranes described herein are useful for purification of aqueous streams in the absence of hydrophilic copolymers or any other viscosity modifier.

The porous support layer can further comprise an additional polymer (e.g., poly(2,6-dimethyl-1,4-phenylene ether), polyethersulfone, polysulfone, polyphenylsulfone, or a combination comprising at least one of the foregoing) in an amount of 0.1 to 20 weight percent, specifically 1 to 10 weight percent, based on the total weight of the porous support layer. In this way, a combination of beneficial properties attributable to each hydrophobic polymer in a blend can be obtained.

The porous composite membrane further comprises an ultrathin, cross-linked, water permeable layer in contact with the porous support layer. The term "ultrathin" as used herein means a water permeable membrane having a thickness of 0.01 to 10 micrometers, preferably 0.02 to 5 micrometers.

Within this range, the thickness can be greater than 0.05 micrometers or less than or equal to 0.2 micrometers.

The water permeable layer can comprise the reaction product of an electrophilic monomer and a nucleophilic monomer. In some embodiments, the ultrathin, cross-linked, water permeable layer comprises a crosslinked polyamide, which is the interfacial condensation product of an aromatic, polyfunctional acyl halide comprising of 3 to 6 acyl halide groups per aromatic ring dissolved in a polar solvent, and an aromatic polyamine comprising at least two primary amine groups and a maximum number of primary amine groups that is less than or equal to the number of acyl halide groups on the polyfunctional acyl halide, dissolved in a non-polar solvent. The polyamide can comprise, for example, the interfacial condensation product of 1,3,5-trimesoyl chloride dissolved in a non-polar solvent, and m-phenylene diamine dissolved in a polar solvent.

A method of forming the porous composite membrane comprises: contacting a solution comprising an nucleophilic monomer in a polar solvent with a porous support layer, comprising a hydrophobic polymer comprising a poly(phenylene ether) or poly(phenylene ether) copolymer and an amphiphilic copolymer comprising a hydrophobic block and a hydrophilic block or graft wherein the hydrophobic block comprises a polystyrene block, a poly(phenylene ether) block or a poly(phenylene ether) copolymer block; contacting a solution comprising an electrophilic monomer in a non-polar solvent, that is immiscible with the polar solvent, with the porous support layer, thereby forming a second layer in contact with the porous support layer by interfacial polymerization; heating the porous composite membrane for a temperature and time sufficient to cure the second layer to form an ultrathin, cross-linked, water permeable layer in contact with the porous support layer; optionally rinsing the porous composite membrane with a non-solvent; and optionally drying the porous composite membrane. In some embodiments, the composite membranes are autoclaved or otherwise steam-sterilized, for example at temperatures of at least 121° C. for at least 21 minutes.

Electrophilic monomers can include of acyl halide, isocyanate, carbamoyl halide, haloformate, anhydride, phosphoryl halide, sulfonyl halide, and combinations comprising one or more of the foregoing. Examples of electrophilic monomers include 1,3- and 1,4-benzene dicarboxylic acid halides; 1,2,4- and 1,3,5-benzene tricarboxylic acid halides; 1,3- and 1,4-cyclohexane dicarboxylic acid halides; 1,2,3,5-cyclopentanetetracarboxylic acid chloride, 1,2,4- and 1,3,5-cyclohexane tricarboxylic acid halides; trimellitic anhydride; benzene tetracarboxylic acid halides; pyromellitic acid dianhydride; naphthalene tetracarboxylic dianhydride; sebacic acid halides; azelaic acid halides; adipic acid halides; dodecanedioic acid halides; acid carboxylic halide-terminated polyamide oligomers; 2,4-toluene diisocyanate; 4,4'-methylene bis (phenylisocyanate); naphthalene di-, tri- and tetra-isocyanates; hexamethylene diisocyanate; phenylene diisocyanates; haloformyloxy benzene dicarboxylic acid halides; 1-isocyanatobenzene-3,5-dicarboxylic acid halides; benzene di-, tri- and tetrasulfonyl chlorides such as 1,3- and 1,4-benzenedisulfonyl chloride, 1,3,5-benzenetrisulfonyl chloride and naphthalene di-, tri- and tetrasulfonyl chlorides such as 1,3,6(7)-naphthalene trisulfonyl chloride, 4,4'-biphenylenedisulfonyl halide; dimethyl piperazine-N,N'-diformyl halides; piperazine-N,N'-diformyl halides; haloformates such as xylylene glycol dihaloformates; benzene diol dihaloformates; benzene triol trihaloformates; phosgene; diphosgene; triphosgene; N,N'-carbonyl diimidazole; isocyanuric acid-N,N',N"-triacetyl halide; isocyanuric acid-N,N',N"-tripropionyl halide; cyclopentane tetracarboxylic acid halides; and combinations thereof.

Nucleophilic monomers include polyethylenimines; piperazine; methylpiperazine; dimethylpiperazine; homopiperazine; ethylene diamine; tetramethylenediamine; amine-terminated polyamide oligomers; amine-terminated polyamides; amine-terminated poly(propylene oxide); amine-terminated poly(ethylene oxide); amine-terminated polytetrahydrofuran; amine-terminated poly(propylene oxide)-poly(ethylene oxide) random and block copolymers; reaction products of amines with a poly(epihalohydrin); diaminocyclohexane; triaminocyclohexane; di-, tri- and tetra-aminobenzenes such as 1,3-diaminobenzene, 1,4-diaminobenzene, 1,3,5-triaminobenzene, and 1,2,4-triaminobenzene; di-, tri- and tetra-aminobenzanilides, such as 4,4'-diamino-, 3,4'-diamino-, 3,3'-diamino, 3,5,3'-triamino, and 3,3',5,5'-tetraaminobenzanilides; xylene diamines such as 1,3- and 1,4-xylylene diamines; chlorophenylene diamines; tetrakis aminomethyl methane, diaminodiphenyl methanes; N,N'-diphenylethylenediamine; aminobenzamides; aminobenzhydrazides; bis(alkyl amino)phenylenediamines; melamine; and tris (aziridinyl) propionates.

The electrophilic monomer can be an aromatic polyacyl halide. Although up to about 50 weight percent of the polyacyl halide can comprise a diacyl halide, a polyacyl halide with a functionality of at least three should be present for adequate cross-linking. In some embodiments, the polyacyl halides can be represented by the formula $Ar(COX)_a$ where Ar is a mononuclear aromatic radical of valence 6-a; X is F, Cl, Br, or I; and a is an integer greater than 2 but less than or equal to 6. Greater than or equal to 50 weight percent of the compound $Ar(COX)_a$ is replaceable with the compound $Ar(COX)_{a-1}$, wherein Ar, X, and a are as defined previously. For example when a is 3, greater than or equal to 50 weight percent of $Ar(COX)_3$ can be replaceable with $Ar(COX)_2$.

The non-polar solvent can be a $C_1$-$C_{12}$ alkane or halogenated alkane solvent. The non-polar solvent, can be for example, pentanes, hexanes, heptanes, octanes, trichlorotrifluoroethane, or a combination comprising one or more of the foregoing. The polyacyl halide should have a solubility of greater than or equal to 0.01 to 90 weight percent based in the combined weight of the polyacyl halide and non-polar solvent. Within this range, the solubility can be greater than or equal to 1 weight percent, or less than or equal to 50 weight percent.

The nucleophilic monomer can be an aromatic polyamine. The aromatic polyamine can be a monocylic or bicyclic aromatic polyamine, and the amine groups can be primary amine groups to maximize reactivity. The polar solvent can comprise water. When the polar solvent comprises water, the aromatic polyamine should be water-soluble. Thus, when bicyclic aromatic polyamines are used, the aromatic rings can be isolated rather than fused, and the aromatic rings can be linked by a hydrophilic bridge, for example bridge comprising divalent oxygen. The aromatic nucleus of the polyamine can be carbocyclic or heterocyclic. In some embodiments, the aromatic nucleus is carbocyclic. In some embodiments, the aromatic nucleus does not comprise any substituents other than the primary amine groups. The aromatic polyamine can be represented by the formula $Ar'(NH_2)_b$, wherein Ar' is an aromatic nucleus of valence b. The aromatic polyamine can be mononuclear and free of any acyl halide-reactive groups other than the primary amine groups, and b is greater than 1 and less than "a", the number of functional groups on the aromatic polycarboxylic halide. When a single aromatic polyamine is used, "b" can be 2.

However, as with the polycarboxylic halides, mixtures of polyamines having different b values can be used, provided that the average for b is greater than 1 and less than or equal to "a." The aromatic polyamine can be mixed with an aliphatic or aliphatic heterocyclic polyamine, provided that aromatic polyamine is in excess of the aliphatic or aliphatic heterocyclic polyamine. For example, piperazine can be mixed with the aromatic polyamine. In some embodiments, the aromatic polyamine can be a monocyclic aromatic diamine such as 1,3- or 1,4-phenylene diamine.

In some embodiments, the ultrathin, cross-linked, water permeable layer comprises a polyamide, which is the interfacial condensation product of an aromatic, polyfunctional acyl halide comprising of 3 to 6 acyl halide groups per aromatic ring dissolved in a polar solvent, and an aromatic polyamine comprising at least two primary amine groups and a maximum number of primary amine groups that is less than or equal to the number of acyl halide groups on the polyfunctional acyl halide, dissolved in a non-polar solvent. For example, the polyamide can be the interfacial condensation product of 1,3,5-trimesoyl chloride dissolved in a non-polar solvent, and m-phenylene diamine dissolved in a polar solvent.

The porous composite membrane described herein has many advantageous properties. The amphiphilic block copolymers described herein provide porous composite membranes having hydrophilic surfaces, as measured, for example, by contact angle. In an embodiment in which the ultrathin cross-linked, water permeable layer comprises a polyamide, and while not wanting to be bound by theory, it is understood that the hydrophilic properties of the surface are provided by the polyamide layer. Because of the hydrophilic surface, the porous composite membranes can be used for purification of aqueous streams, and are resistant to fouling. Advantageously, the presence of the amphiphilic block copolymer in the porous composite membrane does not adversely affect the pore size distribution, membrane selectivity, or permeation flux. The poly(phenylene ether) and poly(phenylene ether) copolymers described herein are miscible with the poly(phenylene ether), poly(phenylene ether) copolymer, or polystyrene blocks of the amphiphilic block copolymer. Therefore, the hydrophobic blocks of the amphiphilic block copolymer tend to dissolve in the poly(phenylene ether) or poly(phenylene ether) copolymer of the porous composite membrane, as indicated by reduced glass transition temperatures for the hydrophobic polymer phase. In this way, the amphiphilic block copolymers resist extraction by water. Advantageously, this results in reduced loss of amphiphilic block copolymer in the membrane phase inversion and washing steps, and reduced loss of amphiphilic block copolymer upon contact with aqueous streams in end-use applications.

The configuration of the porous composite membrane can be sheet, disc, spiral wound, or plate and frame. For example, the configuration can be that of a rectangular sheet or a disc. Sheet and disc configurations can be used for dead-end separations, in which the aqueous feed enters on one side of the sheet or disc, and the permeate exits on the opposite side.

The porous composite flat sheet can be spiral wound. Thus, in some embodiments, a spiral wound module comprises a porous composite flat sheet. A spiral wound module comprises two porous composite membrane sheets separated by a highly porous feed spacer sheet to form a "leaf". The leaves of membrane and feed gas spacer are then inserted between permeate spacer sheets which are connected on one edge to a core tube. The permeate spacer sheets provide open flow channels for the permeate. The leaves are adhered to the permeate spacer sheets on each of three exposed sides, and then rolled around the core tube. The resulting spiral wound membrane assembly is housed in a shell so that the surface of the membrane opposite the non-porous surface layer is completely sealed to the edges of the permeate spacer. The aqueous feed passes through the feed spacer sheet contacting the non-porous surface layer of the membrane. The permeate passes through the membrane into the permeate channel, then flows in a spiral direction to the center of the module, and is collected in the core tube. The spiral wound membrane assemblies are loaded into pressure vessels for use.

The porous composite membrane can be in a plate and frame configuration. Plate and frame modules are akin to plate and frame heat exchangers. A plate and frame module consists of a frame which holds a series of closely spaced porous composite membrane sheets. Gaskets around the perimeter of the membrane sheets are arranged to contain and direct the aqueous feed and permeate, so that the aqueous feed and permeate can pass in opposite directions through alternating channels between membrane sheets. The aqueous feed enters on a first side of the module, flows through alternating channels between membrane sheets, and the retentate exits from the second side of the module. The permeate enters on the second side of the module, flows through alternating channels between membrane sheets in the opposite direction, and exits from the first side of the module.

The porous composite membrane in the separation module can be housed in a pressure vessel. The pressure vessel can be designed to withstand water pressures in excess of atmospheric pressure. Depending upon the type of separation, the pressure vessels can be designed to withstand pressures of about 10 to about 1200 pounds per square inch. In particular, reverse osmosis can require pressures of about 180 to 1200 pounds per square inch.

The porous composite membranes are useful for treatment of aqueous streams. Depending upon pore size and porous composite membrane configuration, the membranes can be used to remove suspended matter, particulate matter, sands, silt, clays, cysts, algae, microorganisms, bacteria, viruses, colloidal matter, synthetic and naturally occurring macromolecules, dissolved organic compounds, salts, or a combination comprising at least one of the foregoing. Thus, the porous composite membranes disclosed herein can be used in wastewater treatment, water purification, food processing, the dairy industry, biotechnology, and healthcare.

Depending upon the pore size, the porous composite membranes described herein can be used for media filtration, microfiltration, ultrafiltration, nanofiltration, or reverse osmosis. For media filtration, the pore size can be about 100 to about 1,000 micrometers. For microfiltration, the pore size can be about 0.03 to about 10 micrometers. For ultrafiltration, the pore size can be about 0.002 to 0.1 micrometers. For nanofiltration, the pore size can be about 0.001 to about 0.002 micrometers. For reverse osmosis, the pore size can be about 0.0001 to 0.001 micrometers.

Depending upon porous composite membrane pore size and end-use, the separation module can be a microfiltration module, an ultrafiltration module, a nanofiltration module, or a reverse osmosis module. The module can also be a media filtration module, a membrane contactors module, a pervaporation module, a dialysis module (e.g., a renal dialysis module), an osmosis module, an electrodialysis module, a membrane electrolysis module, an electrophoresis module, or a membrane distillation module.

Flux across the membrane is driven by the osmotic or absolute pressure differential across the membrane. The pressure differential across the membrane can be 200 kilopascals (kPa) to 2000 kPa for fresh and brackish water, or 1500 kPa to 3000 kPa for seawater, for example.

Figure 2:
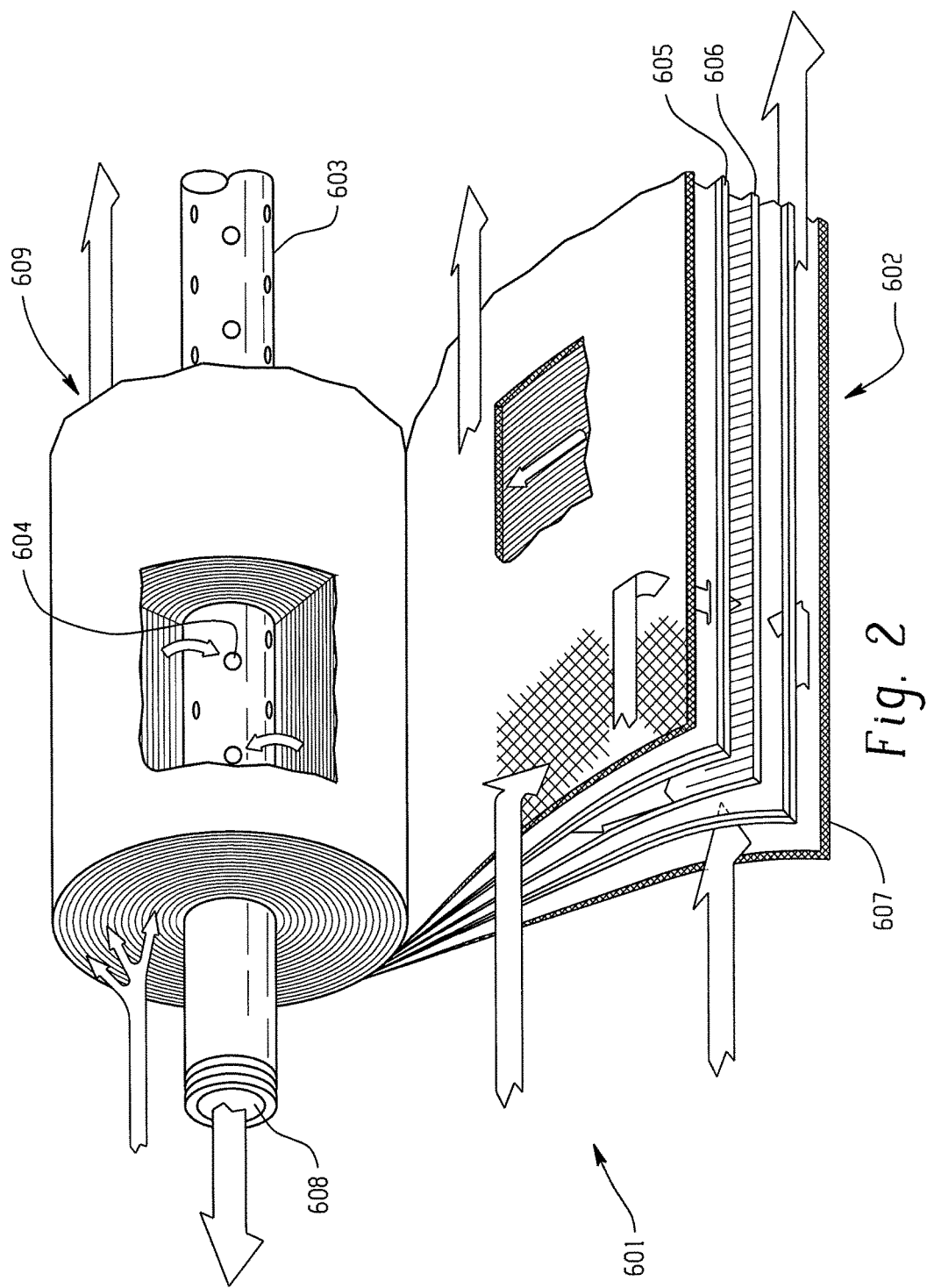
FIG. 2 shows an embodiment of a spiral wound separation module.

The separation module may have a spiral wound design, as shown in FIG. 2. A spiral wound separation module 61 may comprise a sheet of the asymmetric membrane 62 wound onto a hollow core member 63 having perforations 64. Alternatively, the hollow core member 63 may comprise a porous material. Additional layers, such as reinforcing layer 65, inner spacer 66, and outer spacer 67 are also provided. The permeated fluid passes through the perforations 64 in the hollow core member 63 and can be removed through the output 68 of the hollow core member 63. Retentate fluid passes through the outer spacer 67 and exits through the residual output 69.

Figure 3:
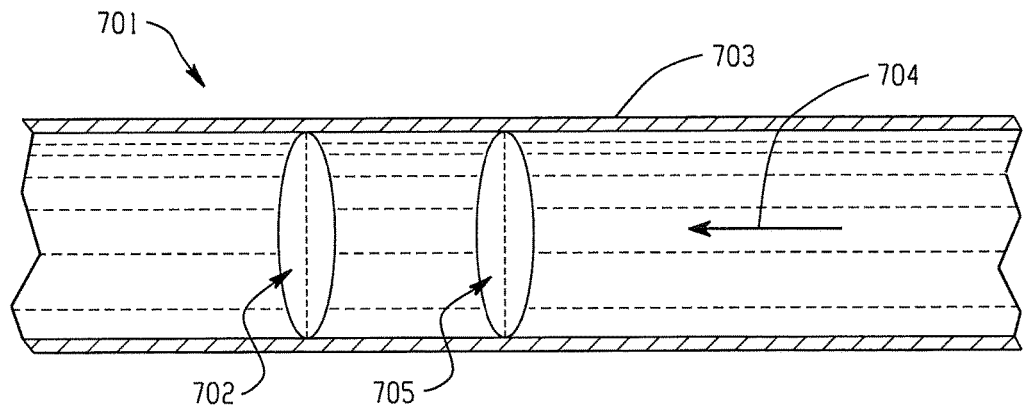
FIG. 3 shows an embodiment of a disk separation module.

The separation module may have a disk design, as shown in FIG. 3. A disk separation module 71 may comprise a filter 72 comprising the asymmetric membrane disposed within a tube 73. The tube may comprise any suitable material, such as a material that is impermeable to the fluid. A support (not shown) may be optionally present. The fluid 74 may contact the disk at a selected pressure sufficient to cause the permeate to pass through the disk. In another embodiment, a plurality of disks may be used, for example to provide a prefilter 75. The prefilter 75 may be the same as or different than the filter 72. For example, the prefilter 75 may have larger pores than the filter 72, or the prefilter 75 may further comprise a functionalized surface, e.g., a surface having a catalyst disposed thereon. In another embodiment the prefilter 75 comprises the asymmetric membrane and the filter 72 comprises a different material.

Figure 4:
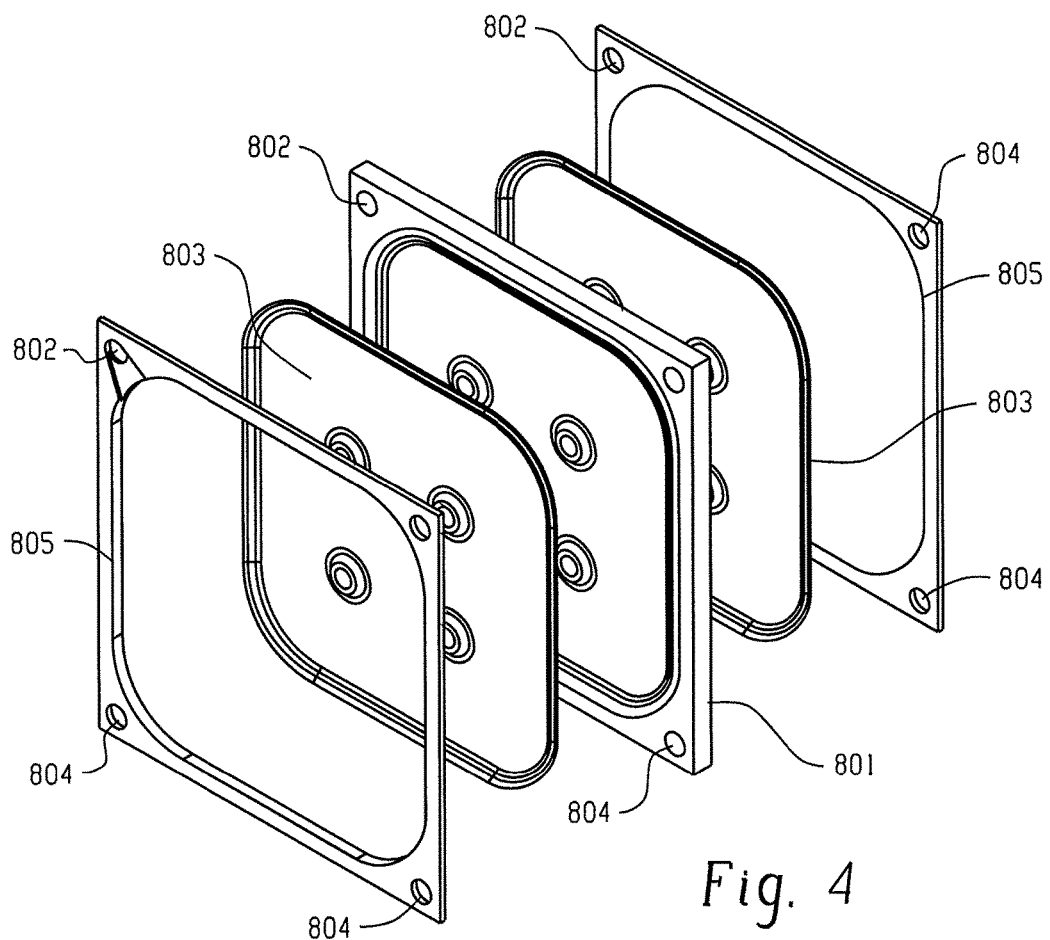
FIG. 4 shows an embodiment of a plate and frame separation module.

The separation module may have a plate and frame design, as shown in the expanded view of FIG. 4. A filter plate of the separation module may comprise a base body 81, the asymmetric membrane 83, and a frame 85, wherein the frame 85 comprises an inlet 82 and an outlet 84. The asymmetric membrane is mounted on one or both sides of the base body and is held in place by a frame mounted in face to face contact with the asymmetric membrane to form the filter plate. The filter can have any suitable shape, and can be square, round, rectangular, or polygonal. The inlet and outlet allow entry of the input stream and exit of the permeate stream. An advantage of the plate and frame design is that the filter media used in making the filter plate assembly can be replaced when desired. The frame 85 and base body may comprise any suitable material, such as a metal, such as steel, or aluminum, or a polymer such as polypropylene or polyethylene. The frame 85 may be fabricated by a molding or a casting process and then machined to the desired size. Due to the solid nature of the frame 85, it can hold the asymmetric membrane 83 to the base body 81 tightly and provide a desirable sealing effect.

The composite membranes are well suited for the production of drinking water from salt or brackish water, for example, by reverse osmosis. Reverse osmosis membranes are designed to remove dissolved salts from water. Water passes readily through the reverse osmosis membrane, whereas dissolved salt is retained. Under natural conditions of osmosis, water will permeate through a semipermeable membrane toward a region of higher salt concentration in order to equalize solution strength on both sides of the membrane. In order to overcome and reverse this osmotic tendency, pressure is applied to feedwater to force water to permeate from a region of higher salt concentration to lower salt concentration, thereby producing purified water.

Figure 5:
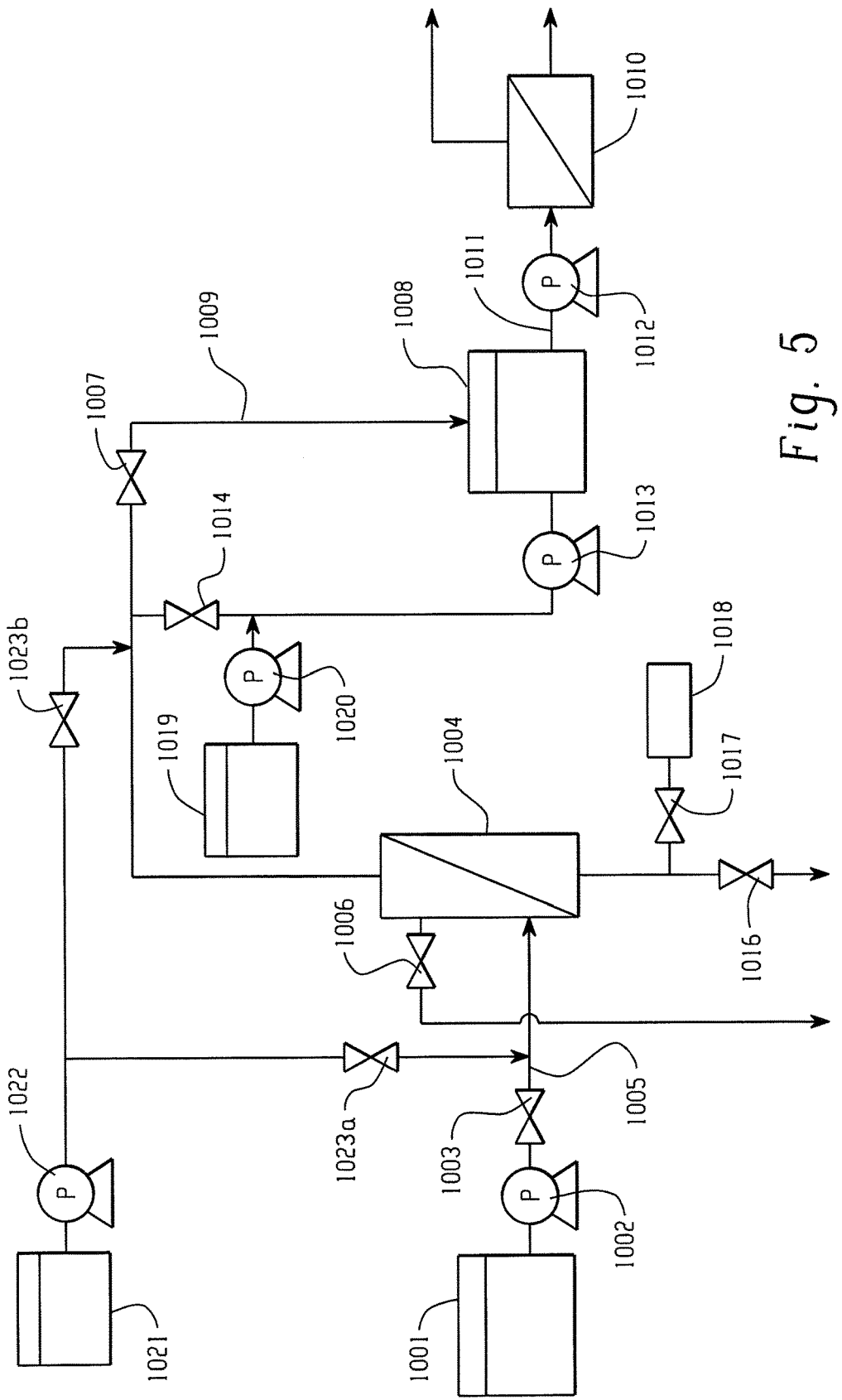
FIG. 5 shows an embodiment of a water pretreatment system.

The membrane may have particular application pretreatment of water in a desalination system. The pretreatment may remove or treat any solutes that may that may foul or scale the desalination element. Also pretreatment removes microorganisms, including bacteria and protozoa, and their metabolites, as well as colloidal substances, which can reduce the quality permeates the desalination system. An embodiment of a water pretreatment system is shown in FIG. 5. As shown in FIG. 5, a raw water storage tank 101, a raw water feed pump 102 for feeding raw water, a raw water feed valve 103 opened at the time of feeding the raw water, a separation module comprising the porous composite membrane 104 for filtering the raw water, a raw water pipeline 105 through which the raw water fed from the raw water storage tank 101 to the separation membrane module 104 passes, an air vent valve 106 openable for back-pressure washing or air washing, a filtrate valve 107 opened at the time of filtration, a filtrate storage tank 108 for storing a hollow fiber membrane filtrate, a filtrate pipeline 109 for sending the filtrate from the separation module 104 to the filtrate storage tank 108, a semipermeable membrane unit 1010 for treating the filtrate of the separation module 104, a semipermeable membrane feed water pipeline 1011 through which the separation membrane filtrate sent from the filtrate storage tank 108 to the semipermeable membrane unit 1010 passes, a booster pump 1012 for feeding the hollow fiber membrane filtrate to the semipermeable membrane unit 1010, a backwash pump 1013 for feeding the separation membrane filtrate to perform back-pressure washing of the separation membrane module 104, a backwash valve 1014 opened at the time of the back-pressure washing, a backwash pipeline 1015 through which the separation membrane filtrate fed from the filtrate storage tank 108 to the separation membrane module 104 passes, a discharging valve 1016 opened in the case of discharging water on a primary side of the separation membrane module 104, an air valve 1017 openable for feeding compressed air to a lower portion of the separation membrane module 104 to perform air washing, a compressor 1018 as a feed source of the compressed air, a chlorine agent storage tank 1019 for storing a chlorine agent, a chlorine agent feed pump 1020 for feeding the chlorine agent to the back-pressure washing water, an ammoniacal compound/amino group-containing compound storage tank 1021 for storing an ammoniacal compound and/or an amino group-containing compound, an ammoniacal compound/ amino group-containing compound feed pump 1022 for feeding the ammoniacal compound and/or the amino group-containing compound to the feed water to the separation membrane module 104 and to a pipeline on a secondary side thereof, an ammoniacal compound/amino group-containing compound feed valve 1023a openable for adding the ammoniacal compound and/or the amino group-containing compound to the feed water of the separation membrane module 104 and an ammoniacal compound/amino group-containing compound feed valve 1023b openable for adding the ammoniacal compound and/or the amino group-containing compound to the pipeline on the secondary side of the separation membrane module 104. The semipermeable membrane unit 1010 may also comprise the porous composite membrane, however the porous composite membrane of the separation membrane module 104 and the porous composite membrane of the semipermeable membrane unit 1010 are different. Alternatively, the membrane of the semipermeable membrane unit 1010 may be a cellulose acetate, polyamide, polyester, or polyimide semipermeable membrane, for example.

Figure 6:
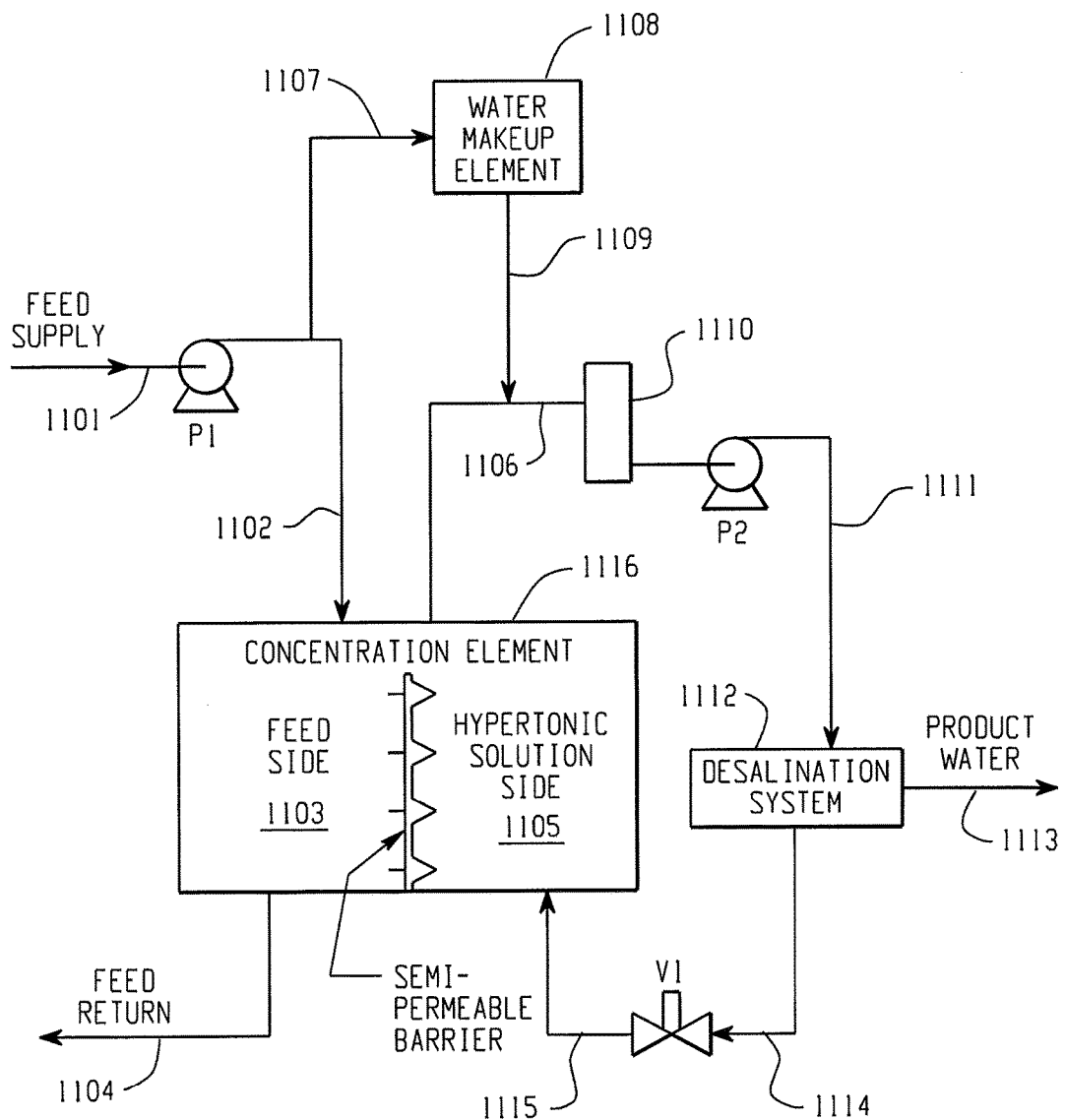
FIG. 6 shows another embodiment of a water pretreatment system.

Another embodiment of a water pretreatment system is shown in FIG. 6. A hypertonic solution can comprise a concentrated feed and its solute composition is the same as that in the feed. However, in a hypertonic solution, contamination components have been concentrated to a level higher than the feed. Additionally, in the hypertonic solution, any solutes that may foul or scale the desalination element can be removed or in some cases addressed by the introduction of anti-scale agents. The membrane separates the feed 113 and the hypertonic solution 115. In such an embodiment, water flows from the feed into the hypertonic solution across the membrane according to water concentration gradients from the feed to the hypertonic solution. Thus, the feed water can be concentrated and the hypertonic solution can be diluted in a concentration module 1116 which comprises the membrane. The hypertonic solution can then be re-concentrated in a desalination system by distillation, electrodialysis or otherwise and then recycled back into a concentration module comprising the membrane. As shown in FIG. 6, feed 111 enters the system through pump P1 and exits by a discharge 114. In the concentration element, the feed 112 can be passed across one side of the separation membrane on the feed side of the concentration module 113. On the permeate side of the membrane is a hypertonic solution. The hypertonic solution can comprise feed water that has been concentrated to a level higher than the feed but lower than its solubility threshold. In the concentration element, water diffuses along concentration gradients from the higher liquid content feed 113 through the membrane and into the lower liquid content hypertonic solution 115. The feed 112 can therefore be concentrated and the hypertonic solution 5 can be diluted in the concentration module 1116. In the desalination system water can be removed from the hypertonic solution. This water becomes the product 1113 of the overall process. The hypertonic solution can be re-concentrated as a result of the removal of the product water. This reconstituted hypertonic solution 1114 can be then passed through valve V1 and returned back to the hypertonic solution side of the concentration module 1115 and the process can be repeated. Lost solute can be made-up by diverting a constant flow of feed 117 back into the hypertonic solution 119. After mixing the feed makeup 119 with the hypertonic solution 116 it can be passed into a permeate holding tank 1110. From tank 1110 the fluid can then be pumped by P2 via 1111 into the desalination system 1112.

The porous composite membrane is also useful for wastewater treatment, for example the treatment water contaminated with oil.

Embodiment 1

A porous composite membrane comprising: a porous support layer comprising, consisting essentially of, or consisting of a hydrophobic polymer comprising, consisting essentially of, or consisting of a poly(phenylene ether) or poly(phenylene ether) copolymer; and an amphiphilic copolymer comprising a hydrophobic block and a hydrophilic block or graft wherein the hydrophobic block comprises a polystyrene block, a poly(phenylene ether) block or a poly(phenylene ether) copolymer block; and an ultrathin, cross-linked, water permeable layer in contact with a side of the porous support layer, and comprising the reaction product of an electrophilic monomer and a nucleophilic monomer.

Embodiment 2

The porous composite membrane of claim 1, wherein the hydrophobic polymer comprises a poly(phenylene ether) having repeat units (I), wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

Embodiment 3

The porous composite membrane of embodiment 1 or 2, wherein the hydrophobic polymer comprises a poly(phenylene ether) copolymer comprising: 100 to 20 mole percent repeat units derived from 2,6-dimethylphenol; and 0 to 80 mole percent repeat units derived from the second monohydric phenol (II) wherein Z is $C_{1-12}$ alkyl, $C_{3-12}$ cycloalkyl, or monovalent group (III), wherein q is 0 or 1, and $R^1$ and $R^2$ are independently hydrogen or $C_1$-$C_6$ alkyl; wherein the mole percents are based on the total moles of all repeat units; and wherein the poly(phenylene ether) copolymer has an intrinsic viscosity of 0.7 to 1.5 deciliters per gram, measured in chloroform at 25° C.

Embodiment 4

The porous composite membrane of any of embodiments 1-3, wherein the hydrophobic polymer comprises a poly(phenylene ether) copolymer comprising: 80 to 20 mole percent repeat units derived from 2,6-dimethylphenol; and 20 to 80 mole percent repeat units derived from the second monohydric phenol.

Embodiment 5

The porous composite membrane of embodiment 4, wherein the second monohydric phenol is 2-methyl-6-phenylphenol.

Embodiment 6

The porous composite membrane of any of embodiments 1-5, wherein the hydrophobic polymer has an intrinsic viscosity of 0.7 to 1.5 deciliters per gram, measured in chloroform at 25° C.

Embodiment 7

The porous composite membrane of any of embodiments 1-6, wherein the solubility of the hydrophobic polymer in the water-miscible polar aprotic solvent is 50 to 400 grams per kilogram at 25° C., based on the combined weight of the poly(phenylene ether) copolymer and the solvent.

Embodiment 8

The porous composite membrane of any of embodiments 1-7, wherein the amphiphilic block copolymer comprises 20 to 50 weight percent of the hydrophobic block and 50 to 80 weight percent of the hydrophilic block or graft.

Embodiment 9

The porous composite membrane of any of claims 1-8, wherein the hydrophobic block of the amphiphilic block copolymer comprises polystyrene.

Embodiment 10

The porous composite membrane of any one or more of embodiments 1-9, wherein the hydrophobic block of the amphiphilic block copolymer comprises a poly(phenylene ether) block comprising repeat units (I), wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

Embodiment 11

The porous composite membrane of any of embodiments 1-10, wherein the hydrophobic block of the amphiphilic block copolymer comprises a poly(phenylene ether) copolymer block comprising: 100 to 20 mole percent repeat units derived from 2,6-dimethylphenol; and 0 to 80 mole percent repeat units derived from the second monohydric phenol (II), wherein Z is $C_{1-12}$ alkyl, $C_{3-12}$ cycloalkyl, or monovalent group (III), wherein q is 0 or 1, and $R^1$ and $R^2$ are independently hydrogen or $C_1$-$C_6$ alkyl; wherein all mole percents are based on the total moles of all repeat units; and wherein the poly(phenylene ether) copolymer block is derived from a poly(phenylene ether) copolymer having an intrinsic viscosity of 0.1 to 0.5 deciliters per gram, measured in chloroform at 25° C.

Embodiment 12

The porous composite membrane of any of embodiments 1-11, wherein the hydrophobic block of the amphiphilic block copolymer comprises a poly(phenylene ether) copolymer block comprising: 80 to 20 mole percent repeat units derived from 2,6-dimethylphenol; and 20 to 80 mole percent repeat units derived from the second monohydric phenol.

Embodiment 13

The porous composite membrane of embodiment 12, wherein the second monohydric phenol is 2-methyl-6-phenylphenol.

Embodiment 14

The porous composite membrane of any of embodiments 1-13, wherein the hydrophilic block or graft of the amphiphilic block copolymer comprises a polymerized hydrophilic ethylenically unsaturated monomer.

Embodiment 15

The porous composite membrane of embodiment 14, wherein the hydrophilic ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing.

Embodiment 16

The porous composite membrane of any of embodiments 1-15, wherein the hydrophilic block or graft of the amphiphilic block copolymer comprises poly(ethylene oxide) or a copolymer of ethylene oxide with 1,2-propylene oxide, 1,2-butylene oxide, styrene oxide, or a combination comprising at least one of the foregoing, wherein the hydrophilic block or graft comprises sufficient ethylene oxide repeat units for the hydrophilic block to be hydrophilic.

Embodiment 17

The porous composite membrane of any of embodiments 1-16, wherein the hydrophobic block or graft of the amphiphilic block copolymer comprises polystyrene, and the hydrophilic block of the amphiphilic block copolymer comprises poly(ethylene oxide).

Embodiment 18

The porous composite membrane of any of embodiments 1-17, wherein any hydrophilic polymer is excluded.

Embodiment 19

The porous composite membrane of embodiment 18, wherein the excluded hydrophilic polymer comprises poly (N-vinylpyrrolidone), a poly(oxazoline), poly(ethylene oxide), poly(propylene oxide), a poly(ethylene oxide) monoether or monoester, a poly(propylene oxide) monoether or monoester, a block copolymer of poly(ethylene oxide) and poly(propylene oxide), polysorbate, cellulose acetate, or a combination comprising at least one of the foregoing.

Embodiment 20

The porous composite membrane of any of embodiments 1-19, further comprising an additional hydrophobic polymer, wherein the additional hydrophobic polymer is poly(2,6-dimethyl-1,4-phenylene ether), polyethersulfone, polysulfone, polyphenylsulfone, or a combination comprising at least one of the foregoing.

Embodiment 21

The porous composite membrane of any of embodiments 1-20, wherein the cross-linked, water permeable layer comprises a polyamide that is the interfacial condensation product of: an aromatic, polyfunctional acyl halide comprising of 3 to 6 acyl halide groups per aromatic ring dissolved in a polar solvent, and an aromatic polyamine comprising at least two primary amine groups and a maximum number of primary amine groups that is less than or equal to the number of acyl halide groups on the polyfunctional acyl halide, dissolved in a non-polar solvent.

Embodiment 22

The porous composite membrane of embodiment 21, wherein the polyamide comprises the interfacial condensation product of 1,3,5-trimesoyl chloride dissolved in a non-polar solvent, and m-phenylene diamine dissolved in a polar solvent.

Embodiment 23

The porous composite membrane any of embodiments 1-22, wherein a configuration of the porous composite membrane is a sheet, disc, spiral wound, plate and frame, hollow fiber, capillary, or tube.

Embodiment 24

The porous composite membrane of any of embodiments 1-23, wherein the membrane has a configuration of a porous composite flat sheet.

Embodiment 25

The porous composite membrane of any of embodiments 1-23, wherein the membrane is in a form of a hollow fiber.

Embodiment 26

A separation module comprising the porous composite membrane of any of embodiments 1-25.

Embodiment 27

The separation module of embodiment 26, wherein the separation module is configured for dead-end filtration, outside-in filtration, inside-out filtration, or cross-flow filtration.

Embodiment 28

The separation module of embodiment 26 or 27, wherein the separation module is a microfiltration module, an ultrafiltration module, a nanofiltration module, a reverse osmosis module, or a membrane distillation module.

Embodiment 29

The separation module of any of embodiments 26-28, comprising a bundle of hollow fibers.

Embodiment 30

The separation module of embodiment 29, wherein the bundle of hollow fibers are disposed within an enclosure configured for fluid separation.

Embodiment 31

The separation module of any of embodiment 29, wherein the separation module comprises: an enclosure configured to contain the bundle of hollow fibers, the enclosure having an outlet configured for withdrawing a permeate fluid; a first encasement comprising a thermoset or a thermoplastic polymeric material and located at a first end of the bundle of hollow fibers, arranged such that the hollow fibers are embedded in the first encasement and communicate through the first encasement and are open on an outer face of the first encasement; a second encasement comprising a thermoset or a thermoplastic polymeric material and located at a second end of the bundle opposite the first end of the bundle, arranged such that the hollow fibers are embedded in the second encasement and communicate through the second encasement and are open on an outer face of the second encasement; a first end cap arranged and configured for attaching and sealing to the first end of the bundle or enclosures at or near the first encasement; a second end cap arranged and configured for attaching and sealing to the second end of the bundle or enclosures at or near the second encasement; an inlet for introducing a fluid mixture to be separated into bores of the hollow fiber membranes at the first encasement; and an outlet for withdrawing a retentate fluid from the bores for the hollow fiber membranes at the second encasement.

Embodiment 32

The separation module of any of embodiments 29-31, comprising a plurality of the bundles of hollow fibers.

Embodiment 33

The separation module of any of embodiments 26-28, wherein separation module comprises: a hollow core comprising perforations; the porous composite membrane wound around the core; and a spacer disposed adjacent the porous composite membrane.

Embodiment 34

The separation module of any of embodiments 26-28 and 33, further comprising at least one of an inner spacer or an outer spacer adjacent the porous composite membrane.

Embodiment 35

A spiral wound module comprising the porous composite flat sheet of embodiment 24.

Embodiment 36

A method of filtration comprising passing a feedstream through the separation module of any of embodiments 26-35 such that it contacts a first side of the porous composite membrane, and passing a permeate through the porous composite membrane to provide a permeate stream and a concentrated feedstream.

Embodiment 37

A method of water purification comprising: passing a feedwater through the separation module of any of embodiments 26-35 such that the feedwater contacts a first side of the porous composite membrane with a pressure greater than osmotic pressure to produce purified water.

Embodiment 38

The method of water pretreatment of embodiment 37, further comprising: a semipermeable membrane unit for treating a filtrate of the separation module; a back-pressure washing unit for feeding water from a secondary side of the membrane module to a primary side thereof; a chlorine agent feed unit for feeding a chlorine agent to the water; and an ammoniacal compound and/or amino group-containing compound feed unit for feeding an ammoniacal compound and/or an amino group-containing compound to the primary side of the separation module.

Embodiment 39

A water pretreatment system comprising the separation module of any of embodiments 26-34.

Embodiment 40

A water pretreatment system comprising: a concentration module comprising the porous composite membrane of any of embodiments 1-25 for concentrating a feed and diluting a recirculating hypertonic solution to produce a slipstream; and a water makeup element for receiving the slipstream and combining the slipstream with the hypertonic solution to provide solutes to the recirculating hypertonic solution, wherein the recirculating hypertonic solution is suitable for desalination.

Embodiment 41

The water pretreatment system of embodiment 40, wherein the concentrator comprises the separation module of any of embodiments 26-34.

Embodiment 42

A method of pretreating water, the method comprising: receiving a feed water; separating the feed water into a concentrator feed and a slipstream; processing the concentrator feed in a concentrator comprising the porous composite membrane of any one or more of embodiments 1-25 to generate a hypertonic solution; combining the slipstream and the hypertonic solution to generate an effluent capable of decomposition into purified water and a recirculating hypertonic solution.

Embodiment 43

The method of embodiment 42, wherein the concentrator comprises the separation module of any of embodiments 26-34.

Embodiment 44

A separation module for oil-containing wastewater treatment, which separates water-insoluble oil from oil-containing wastewater, the separation module comprising the porous composite membrane of embodiments 1-25.

Embodiment 45

A system for wastewater treatment comprising the separation module of embodiment 44.

Embodiment 46

A method of wastewater treatment comprising treating an oil-containing wastewater with the system of embodiment 45.

Embodiment 47

The method of embodiment 46, further comprising directing a cleaning liquid comprising an alkaline aqueous solution to a surface of the porous composite membrane to remove water-insoluble oil adhering to the surface of the porous composite membrane of the separation membrane module.

Embodiment 48

A method of forming a porous composite membrane, the method comprising: contacting a solution comprising a nucleophilic monomer in a polar solvent with a porous support layer, wherein the support layer comprises a hydrophobic polymer comprising a poly(phenylene ether) or poly(phenylene ether) copolymer and an amphiphilic copolymer comprising a hydrophobic block and a hydrophilic block or graft wherein the hydrophobic block comprises a polystyrene block, a poly(phenylene ether) block or a poly(phenylene ether) copolymer block; contacting a solution comprising an electrophilic monomer in a non-polar solvent that is immiscible with the polar solvent, with the porous support layer to form a second layer in contact with the porous support layer by interfacial polymerization; and heating the second layer and the support layer for a temperature and time sufficient to cure the second layer to form a cross-linked, water permeable layer in contact with the porous support layer to form the porous composite membrane.

Embodiment 49

The method of embodiment 48, further comprising: optionally rinsing the porous composite membrane with a non-solvent; and drying the porous composite membrane.

Embodiment 50

The method of embodiment 48 or 49, wherein the cross-linked, water permeable layer comprises a polyamide that is the interfacial condensation product of an aromatic, polyfunctional acyl halide comprising of 3 to 6 acyl halide groups per aromatic ring dissolved in a polar solvent, and an aromatic polyamine comprising at least two primary amine groups and a maximum number of primary amine groups that is less than or equal to the number of acyl halide groups on the polyfunctional acyl halide, dissolved in a non-polar solvent.

Embodiment 51

The method of any of embodiments 48-50, wherein the polyamide is the interfacial condensation product of 1,3,5-trimesoyl chloride dissolved in a non-polar solvent, and m-phenylene diamine dissolved in a polar solvent.

The invention is further illustrated by the following non-limiting examples.

EXAMPLES

Preparative Examples: Synthesis of MPP-DMP Copolymers

The preparation, characterization and properties of poly(phenylene ether)s has been described by G Cooper and J Bennett in *Polymerization Kinetics and Technology*, Volume 128, pages 230-257, Jun. 1, 1973 (ACS Advances in Chemistry Series). MPP-DMP copolymers were prepared by dissolving the monomers in toluene and conducting oxidative copolymerization mediated by copper-diamine catalyst complexes in the presence of oxygen. The copolymerizations were conducted in a bubbling polymerization reactor equipped with a stirrer, temperature control system, nitrogen padding, oxygen bubbling tube, and computerized control system. The reactor was also equipped with a feeding pot and pump for dosing reactants into the reactor. When the desired degree of polymerization was achieved, the flow of oxygen was stopped and the copper complex was removed from the toluene solution by liquid-liquid extraction with a water-soluble chelating agent. The DMP-MPP copolymers were recovered via non-solvent precipitation by pouring the toluene solution into an excess of methanol with vigorous stirring followed by drying in an oven at 120° C. under a stream of dry nitrogen.

TABLE 1

Materials

| Abbreviation | Chemical Name |
|---|---|
| DMP | 2,6-Dimethylphenol |
| MPP | 2-Methyl-6-phenylphenol |
| DBA | Di-n-butylamine |
| DBEDA | N,N'-Di-tert-butylethylenediamine |
| DMBA | N,N-Dimethylbutylamine |
| QUAT | Didecyldimethyl ammonium chloride |
| NTA | Nitrilotriacetic acid |
| CAT | Solution of $Cu_2O$ in concentrated HBr, 6.5 wt. % Cu |
| NMP | N-Methyl-2-pyrrolidone, available from ThermoFisher. |
| 6020P | A polyethersulfone (PES), available from BASF as ULTRASON ™ E 6020 P. |
| PES | A polyethersulfone, available from BASF as ULTRASON ™ E 6020 P. |
| PVP K30 | Poly(vinyl pyrrolidone) having a K value of 26-35, calculated for a 1% aq. solution by the Finkentscher equation; and available from Aldrich. |
| PVP K90 | Poly(vinyl pyrrolidone) having a K value of 90-100, calculated for a 1% aq. solution by the Finkentscher equation; and available from Aldrich. |

Preparative Example 1: Preparation of MPP-DMP Copolymer with 50 Mole Percent MPP in 1.8-Liter Reactor Toluene (622.88 grams), DBA (8.1097 grams), DMBA (30.71 grams), and 5.44 grams of a diamine mix consisting of 30 weight percent (wt. %) DBEDA, 7.5 weight percent QUAT, and the balance toluene, were charged to a bubbling polymerization reactor and stirred under a nitrogen atmosphere at 25° C. A mix of 6.27 grams HBr and 0.5215 grams $Cu_2O$ was added. Oxygen flow to the vessel was begun after 4 minutes of monomer mixture addition. The reactor temperature was ramped to 40° C. in 18 min, maintained at 40° C. for 57 min, ramped to 45 C in 11 min, maintained at 45° C. for 33 min and ramped to 60° C. in 10 min. 403.67 grams of monomer solution (20.3 wt. % DMP, 30.6 wt. % MPP and 49.1 wt. % toluene) was added over 35 minutes. Oxygen flow was maintained for 115 minutes, at which point the oxygen flow was stopped and the reaction mixture was immediately transferred to a vessel containing 11.07 grams NTA salt and 17.65 grams DI (deionized) water. The resulting mixture was stirred at 60° C. for 2 hours, and the layers were then allowed to separate. The decanted light phase was precipitated in methanol, filtered, reslurried in methanol, and filtered again. The copolymer was obtained as a dry powder after drying in a vacuum oven under nitrogen blanket at 110° C.

Preparative Examples 2-4: Preparation of MPP-DMP Copolymers with 20, 50, and 80 Mole % MPP with IV's of ~1 Deciliter Per Gram The process of Preparative Example 1 was scaled to a one gallon steel bubbling reactor and copolymerization was conducted in similar fashion as described above. The ingredients for the batch reactor charges and continuous monomer feed solution are shown in Table 2. After charging the reactor the contents were brought with stirring to 25° C. before starting the continuous feed of monomer in toluene and then oxygen feed. The monomer/toluene mixture was fed over 45 minutes, and oxygen feed was maintained until 130 minutes. The reactor temperature was ramped to 45° C. at 90 minutes and then ramped to 60° C. at 130 minutes. The reaction contents were then transferred to a separate vessel for addition of NTA to chelate the copper, followed by separation of the toluene solution from the aqueous phase in centrifuge, precipitation of the copolymer solution into methanol as described above.

TABLE 2

Material Amounts for Preparative Examples 2-4

|  | Example 2 | Example 3 | Example 4 |
|---|---|---|---|
| Raw Material (g) |  |  |  |
| MPP/DMP (mole ratio) | 20/80 | 50/50 | 80/20 |
| CAT | 17.3 | 21.6 | 17.3 |
| DBEDA | 5.3 | 6.7 | 5.3 |
| DBA | 9.9 | 9.9 | 9.9 |
| DMBA | 34.3 | 33.3 | 32.5 |
| QUAT | 1.6 | 2.0 | 1.6 |
| DMP/TOLUENE 50/50 | 29.5 | 18.5 | 5.5 |
| TOLUENE | 2961.0 | 2961.0 | 2961.0 |
| MPP | 5.6 | 14.0 | 16.0 |
| Continuous Feed Solution |  |  |  |
| DMP/TOLUENE 50/50 | 364.5 | 228 | 64 |
| MPP | 69.4 | 172 | 197 |
| Total | 3498.36 | 3466.925 | 3310.08 |

The dried copolymers were characterized for molecular weight distribution via size exclusion chromatography using $CHCl_3$ as solvent and referenced to polystyrene standards. Intrinsic viscosity (IV) was measured in $CHCl_3$ solution at 25° C., using an Ubbelohde viscometer, and is expressed in units of deciliters per gram (dL/g). The glass transition temperature Tg was measured using differential scanning calorimetry (DSC) and expressed in ° C. The results for examples 1-4 are summarized in Table 3. "Mn" refers to number average molecular weight, "Mw" refers to weight average molecular weight, "D" refers to polydispersity, and "g" refers to grams.

TABLE 3

Characterization of MPP-DMP Copolymers of Preparative Examples 1-4

| Ex. No. | Scale | MPP/DMP (mole/mole) | GPC Mn (g/mole) | GPC Mw (g/mole) | GPC D (Mw/Mn) | IV in $CHCl_3$ (dL/g) | Tg ° C. |
|---|---|---|---|---|---|---|---|
| 1 | 1.8 liter | 50/50 | 20,213 | 219,130 | 10.8 | 0.83 | 185 |
| 2 | 1 gallon | 20/80 | 50,310 | 172,100 | 3.4 | 1.04 | 210 |

TABLE 3-continued

Characterization of MPP-DMP Copolymers of Preparative Examples 1-4

| Ex. No. | Scale | MPP/DMP (mole/mole) | GPC Mn (g/mole) | GPC Mw (g/mole) | GPC D (Mw/Mn) | IV in CHCl$_3$ (dL/g) | Tg °C. |
|---|---|---|---|---|---|---|---|
| 3 | 1 gallon | 50/50 | 39,820 | 194,900 | 4.9 | 0.97 | 187 |
| 4 | 1 gallon | 80/20 | 22,620 | 241,000 | 10.7 | 0.96 | 177 |

General Procedure for Casting Membranes Via Solvent/Non-Solvent Phase Inversion Process In general, porous asymmetric membranes were cast by dissolving MPP-DMP copolymers and amphiphilic block copolymers comprising a poly(phenylene ether) block or a poly(phenylene ether) copolymer block and a hydrophilic block or graft in N-methyl-2-pyrrolidone (NMP) at concentrations of about 16 wt. % and about 1 to 10 wt. %, respectively; pouring the viscous casting solution onto a glass plate and drawing a thin film 150-250 micrometers thick across the plate by means of a casting knife. The glass plate bearing the thin film of MPP-DMP in NMP was placed into a primary coagulation bath over a time period of 10-15 minutes. The primary coagulation bath was a mixture of NMP and water, and promoted the precipitation and coagulation of the copolymer into an asymmetric porous membrane. The coagulated copolymer film floated free of the glass plate when coagulation was substantially complete, at which time it was transferred to a second bath in which it was soaked and rinsed in clean water to remove residual NMP.

The process is described in more detail as follows. MPP-DMP copolymers and amphiphilic block copolymers comprising a poly(phenylene ether) block or a poly(phenylene ether) copolymer block and a hydrophilic block or graft were dissolved in NMP, chromatography grade, totaling 8-10 grams in a 20-milliliter (mL) glass vial, sealed tightly, and placed on a low speed roller for 13-48 hours until it forms a homogenous solution. The solution was poured in an oblong puddle and an adjustable height doctor blade was used to drag across the glass plate at a constant speed by hand. The entire glass plate bearing the cast copolymer solution was fully submerged into an initial non-solvent bath (10-100 wt. % DI water in NMP) until the membrane begins to lift off the plate. The membrane was transferred off of the glass plate into the intermediate non-solvent bath of 100 wt. % DI water and weighed down at the corners with glass stoppers to allow the exchange of NMP into the water bath. After 15-45 minutes the membrane was transferred to a final non-solvent bath of 100 wt. % water to fully solvent exchange the pores overnight, also weighed down to submerge fully. The membrane was dried at room temperature. Characterization was performed on pieces cut from the center and most uniform portion of the membrane. The viscosity of the copolymer solutions in NMP was measured at 20° C. using a Brookfield RDV-III Pro viscometer equipped with a small-sample adapter and cylindrical spindle.

Characterization of Membranes

A simple estimate of the water flow through the membranes was made by cutting a 47-millimeter (mm) circle of the membrane and placing it on a fritted funnel and clamped. The vacuum filter flask was tared on a balance then 100 g of water was added to the fritted funnel and one atmosphere vacuum was applied for 15-60 min. (minutes). All data were normalized to a 60-min. run time. The water flow was calculated by placing the vacuum filter flask on the tared balance and recording the value.

The surface porosities and cross-sectional morphologies of the membranes were characterized using Carl Zeiss Supra VP scanning electron microscopy (SEM). The "top" membrane surfaces (those that were first in contact with the NMP/water bath) were imaged for selective surface morphology. The membrane samples were coated with ~0.3 nm Pt/Pd target using Cressington 208 high resolution sputter coater equipped with thickness controller MTM-20. The surface morphology was imaged using low voltage capability (≤5 kV, probe current 200 nA and inlens surface sensitive detection mode at 100,000× magnifications. A minimum of 3 images were combined for digital image analysis using Clemex Vision PE 6.0.035 software to estimate the pore size distributions and pooled for the analysis. Samples for cross-sectional imaging were soaked in ethanol for 5 minutes and cryo-fractured using liquid nitrogen, then allowed to come to room temperature and dried in air. The cryo-fractured membrane samples were coated with Pt/Pd target and imaged using SEM for cross sectional morphology.

The interaction of the membrane surfaces with water was quantified via measurement of contact angle using a Kruss DA-25 drop shape analysis system. A small square section of membrane was cut out from the center of the membrane, and mounted on a glass microscope slide using double sided tape. A 2-microliter water droplet was deposited on the surface and the drop shape was measured using digital curve fitting 5 times with a 1 second spacing and the resulting contact angles of the water droplet with the membrane surface were averaged together.

Examples 1-2: Membranes Cast from 20/80 MPP-DMP Copolymer with PS-PEO Diblock Copolymer A sample of an amphiphilic block diblock copolymer was obtained from Sigma-Aldrich, which is described in their catalog as being comprised of a block of polystyrene (PS) having an Mn of about 30,000 g/mole, which has been coupled to a block of poly(ethylene oxide) (POE) of Mn of about 1,000 g/mole. Based on this description, the PS/PEO block copolymer contained only about 3 wt. % of hydrophilic block by weight. Poly(phenylene ether) copolymers were prepared by copolymerization of 2-methyl-6-phenylphenol (MPP) and 2,6-dimethylphenol (DMP). Poly(phenylene ether) comonomer ratios are herein expressed as mole ratios. In Examples 1 and 2, solutions containing 16 wt. % of a 20/80 MPP-DMP copolymer were prepared in the presence of 2 and 4 wt. % of the PS/PEO diblock copolymer, respectively, and cast into membranes following the same procedures as described above. The results of SEM image analysis of these membranes are presented in FIG. 1, with the membrane of Comparative Example 1 on the left, the membrane of Example 1 in the center, and the membrane of Example 2 on the right. The surface appearance of the membranes characterized by SEM were found to be very similar to that of Example 6 which was prepared by casting the MPP-DMP copolymer alone.

The membranes of Examples 1-2, which containing PS/PEO copolymer provided membrane surfaces upon phase-inversion casting which had pore size distributions that showed as good or better consistency in pore size distribution as observed for Comparative Example 1, which was made from 20/80 MPP-DMP copolymer alone. Based on this observation, the presence of short polystyrene blocks did not substantially disrupt the inherently good membrane-forming characteristics of the MPP-DMP copolymer. The contact angle of the membranes containing the PS-PEO diblock show a slight trend towards reduced contact angle, and a decrease in Tg which most likely results from forming a miscible blend between the MPP-DMP copolymer and the PS blocks. It is expected that PS-PEO will not be soluble in NMP/water, contrary to PVP, and so it would be expected to be present in the membrane itself.

TABLE 1

Properties of Membranes Made from Blends of 20/80 MPP-DMP Copolymer and PS/PEO Diblock Copolymer

| Ex. No. | Polymer In NMP Casting Dope (wt %) | Surface Pore Size Distribution of Membrane (μm) | Membrane Tg (° C.) |
|---|---|---|---|
| CE 1 | 16% 20/80 MPP-DMP | 12.2 ± 3.8 | 210 |
| E 1 | 16% 20/80 MPP-DMP + 2% PS-PEO | 10.1 ± 2.0 | 183 |
| E 2 | 16% 20/80 MPP-DMP + 4% PS-PEO | 9.2 ± 1.7 | 176 |

In Examples 1 and 2, the PS-PEO block copolymer can be replaced with an amphiphilic copolymer comprising a hydrophobic block comprises a polystyrene block, a poly(phenylene ether) block or a poly(phenylene ether) copolymer block; and a hydrophilic block or graft.

Composite Membranes

Example 3

A composite membrane can be prepared by immersing the membranes of Comparative Example and Examples 1 and 2 in a solution of 2 wt % m-phenylenediamine in water. After removal of excess m-phenylenediamine solution from the surface of the membrane film, the wet film is then immediately covered with a solution of 0.1% weight/volume trimesoyl chloride (TMC) dissolved in trichlorotrifluoroethane. The contact time for the interfacial reaction is 10 seconds, and the reaction is substantially complete in less than 1 second. The resulting membrane/polyamide composites are air-dried. Removal of the excess polyamine solution from the composite can be accomplished either by pressing with a rubber roller or by draining. Composite membranes in which the 20/80 MPP-DMP copolymer is replaced by 50/50 MPP-DMP copolymer or 80/20 MPP-DMP copolymer can also be prepared by this procedure.

Example 4

The procedure of Example 3 is followed, except that 2 wt % p-phenylenediamine is substituted for m-phenylenediamine. The amine-reactive co-reactant is again 0.1% (w/v) TMC in trichlorotrifluoroethane. Composite membranes in which the 20/80 MPP-DMP copolymer is replaced by 50/50 MPP-DMP copolymer or 80/20 MPP-DMP copolymer can also be prepared by this procedure.

Example 5

The procedure of Example 3 is followed, except 2 wt % 4,4-sulfonyldianiline is substituted for m-phenylenediamine, and the membrane. Composite membranes in which the 20/80 MPP-DMP copolymer is replaced by 50/50 MPP-DMP copolymer or 80/20 MPP-DMP copolymer can also be prepared by this procedure.

Example 6

The procedure of Example 3 is followed, except that 2 wt % 2,5-diaminotoluene is substituted for m-phenylenediamine. Composite membranes in which the 20/80 MPP-DMP copolymer is replaced by 50/50 MPP-DMP copolymer or 80/20 MPP-DMP copolymer can also be prepared by this procedure.

Advantageously, MPP-DMP copolymers having an intrinsic viscosity of 0.7 to 1.5 deciliters per gram, measured in chloroform at 25° C., are soluble in water-miscible, polar aprotic solvents such as NMP. These MPP-DMP copolymers, and optionally their blends with amphiphilic copolymers comprising a hydrophobic block comprising a polystyrene block, a poly(phenylene ether) block or a poly(phenylene ether) copolymer block, and a hydrophilic block or graft are useful as membrane-forming materials. Membranes fabricated form these MPP-DMP copolymers, and optionally their blends with amphiphilic copolymers of PS, can be modified by the application of one or more layers of a cross-linked water permeable layer for purposes of modifying the permeability or selectivity of the composite membrane. The cross-linked water permeable layer can comprise a polyamide that is the interfacial condensation product of: an aromatic, polyfunctional acyl halide comprising of 3 to 6 acyl halide groups per aromatic ring dissolved in a polar solvent, and an aromatic polyamine comprising at least two primary amine groups and a maximum number of primary amine groups that is less than or equal to the number of acyl halide groups on the polyfunctional acyl halide, dissolved in a non-polar solvent.

As used herein, comprising is inclusive of "consisting essentially of" and "consisting of." The use of the terms "a" and "an" and "the" and similar referents in the context of describing the invention (especially in the context of the following claims) is to be construed to cover both the singular and the plural, unless otherwise indicated herein or clearly contradicted by context. "Or" means "and/or." The endpoints of all ranges directed to the same component or property are inclusive and independently combinable. Disclosure of a narrower range or more specific group in addition to a broader range is not a disclaimer of the broader range or larger group. All ranges disclosed herein are inclusive of the endpoints, and the endpoints are independently combinable with each other. The terms "first" and "second" and the like, as used herein do not denote any order, quantity, or importance, but are only used to distinguish one element from another.

As used herein, the term "hydrocarbyl" refers broadly to a substituent comprising carbon and hydrogen, optionally with 1 to 3 heteroatoms, for example, oxygen, nitrogen, halogen, silicon, sulfur, or a combination thereof. Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. All cited patents, patent applications, and other references are incorporated herein by reference in their entirety. However, if a term in the present application contradicts or conflicts with a term in the incorporated reference, the term from the present application takes precedence over the conflicting term from the incorporated reference.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A porous composite membrane comprising:
   a porous support layer comprising a blend of a hydrophobic polymer comprising a poly(phenylene ether) or poly(phenylene ether) copolymer; and an amphiphilic copolymer comprising a hydrophobic block comprising a polystyrene block, a poly(phenylene ether) block or a poly(phenylene ether) copolymer block, and a hydrophilic block or graft; and
   an ultrathin, cross-linked, water permeable layer in contact with a side of the porous support layer, and comprising the reaction product of an electrophilic monomer and a nucleophilic monomer.

2. The porous composite membrane of claim 1, wherein the hydrophobic polymer comprises a poly(phenylene ether) comprising repeat units having the structure:

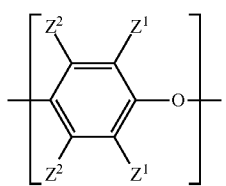

wherein
each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and
each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

3. The porous composite membrane of claim 1, wherein the poly(phenylene ether) or poly(phenylene ether) copolymer comprises:
   100 to 20 mole percent repeat units derived from 2,6-dimethylphenol; and
   0 to 80 mole percent repeat units derived from a second monohydric phenol having the structure

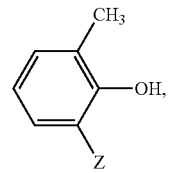

wherein Z is $C_{1-12}$ alkyl or cycloalkyl, or a monovalent group having the structure

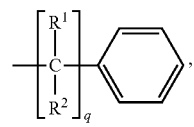

wherein q is 0 or 1, and $R^1$ and $R^2$ are independently hydrogen or $C_1$-$C_6$ alkyl;
   wherein the mole percents are based on the total moles of all repeat units; and
   wherein the poly(phenylene ether) or poly(phenylene ether) copolymer has an intrinsic viscosity of 0.7 to 1.5 deciliters per gram, measured in chloroform at 25° C.

4. The porous composite membrane of claim 3, wherein the hydrophobic polymer comprises a poly(phenylene ether) copolymer comprising:
   80 to 20 mole percent repeat units derived from 2,6-dimethylphenol; and
   20 to 80 mole percent repeat units derived from the second monohydric phenol.

5. The porous composite membrane of claim 4, wherein the second monohydric phenol is 2-methyl-6-phenylphenol.

6. The porous composite membrane of claim 1, wherein the hydrophobic polymer has an intrinsic viscosity of 0.7 to 1.5 deciliters per gram, measured in chloroform at 25° C.

7. The porous composite membrane of claim 1, wherein the solubility of the hydrophobic polymer in the water-miscible polar aprotic solvent is 50 to 400 grams per kilogram at 25° C., based on the combined weight of the poly(phenylene ether) copolymer and the solvent.

8. The porous composite membrane of claim 1, wherein the amphiphilic block copolymer comprises 20 to 50 weight percent of the hydrophobic block and 50 to 80 weight percent of the hydrophilic block or graft.

9. The porous composite membrane of claim 1, wherein the hydrophobic block of the amphiphilic block copolymer comprises polystyrene.

10. The porous composite membrane of claim 1, wherein the hydrophobic block of the amphiphilic block copolymer comprises a poly(phenylene ether) block comprising repeat units having the structure:

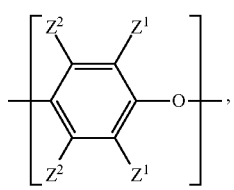

wherein
each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and
each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

11. The porous composite membrane of claim 1, wherein the hydrophobic block of the amphiphilic block copolymer comprises a poly(phenylene ether) block or poly(phenylene ether) copolymer block comprising:
100 to 20 mole percent repeat units derived from 2,6-dimethylphenol; and
0 to 80 mole percent repeat units derived from a second monohydric phenol having the structure

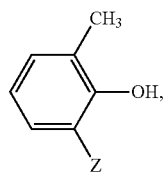

wherein Z is $C_{1-12}$ alkyl or cycloalkyl, or a monovalent group having the structure

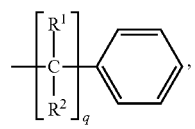

wherein q is 0 or 1, and $R^1$ and $R^2$ are independently hydrogen or $C_1$-$C_6$ alkyl;
wherein all mole percents are based on the total moles of all repeat units; and
wherein the poly(phenylene ether) block is derived from a poly(phenylene ether) having an intrinsic viscosity of 0.1 to 0.5 deciliters per gram, measured in chloroform at 25° C.

12. The porous composite membrane of claim 11, wherein the hydrophobic block of the amphiphilic block copolymer comprises a poly(phenylene ether) copolymer block comprising:
80 to 20 mole percent repeat units derived from 2,6-dimethylphenol; and
20 to 80 mole percent repeat units derived from the second monohydric phenol.

13. The porous composite membrane of claim 12, wherein the second monohydric phenol is 2-methyl-6-phenylphenol.

14. The porous composite membrane of claim 1, wherein the hydrophilic block or graft of the amphiphilic block copolymer comprises a polymerized hydrophilic ethylenically unsaturated monomer.

15. The porous composite membrane of claim 14, wherein the hydrophilic ethylenically unsaturated monomer comprises methoxy-capped poly(ethylene oxide) methacrylate, 4-vinylpyridine, N-vinylpyrrolidone, N,N-dimethylacrylamide, 4-acryloylmorpholine, or a combination comprising at least one of the foregoing.

16. The porous composite membrane of claim 1, wherein the hydrophilic block or graft of the amphiphilic block copolymer comprises poly(ethylene oxide) or a copolymer of ethylene oxide with 1,2-propylene oxide, 1,2-butylene oxide, styrene oxide, or a combination comprising at least one of the foregoing, wherein the hydrophilic block or graft comprises sufficient ethylene oxide repeat units for the hydrophilic block to be hydrophilic.

17. The porous composite membrane of claim 1, wherein the hydrophobic block or graft of the amphiphilic block copolymer comprises polystyrene, and the hydrophilic block of the amphiphilic block copolymer comprises poly(ethylene oxide).

18. The porous composite membrane of claim 1, further comprising an additional hydrophobic polymer, wherein the additional hydrophobic polymer is poly(2,6-dimethyl-1,4-phenylene ether), polyethersulfone, polysulfone, polyphenylsulfone, or a combination comprising at least one of the foregoing.

19. The porous composite membrane of claim 1, wherein the cross-linked, water permeable layer comprises a polyamide that is the interfacial condensation product of an aromatic, polyfunctional acyl halide comprising 3 to 6 acyl halide groups per aromatic ring, dissolved in a non-polar solvent, and an aromatic polyamine comprising a number of primary amine groups that is at least two and less than or equal to the number of acyl halide groups on the polyfunctional acyl halide, dissolved in a polar solvent.

20. The porous composite membrane of claim 19, wherein the polyamide comprises the interfacial condensation product of 1,3,5-trimesoyl chloride dissolved in a non-polar solvent, and m-phenylene diamine dissolved in a polar solvent.

21. The porous composite membrane of claim 1, wherein the hydrophobic block of the amphiphilic copolymer comprises polystyrene.

* * * * *